United States Patent [19]
Krinke et al.

[11] Patent Number: 5,898,544
[45] Date of Patent: Apr. 27, 1999

[54] BASE PLATE-MOUNTED MICROACTUATOR FOR A SUSPENSION

[75] Inventors: Todd A. Krinke, Long Lake; Mark T. Girard, South Haven; Steven J. Knight, Hutchinson, all of Minn.

[73] Assignee: Hutchinson Technology Incorporated, Hutchinson, Minn.

[21] Appl. No.: 08/874,814

[22] Filed: Jun. 13, 1997

[51] Int. Cl.$^6$ ..................................................... G11B 5/48
[52] U.S. Cl. ............................................................ 360/104
[58] Field of Search ..................................... 360/106, 104

[56] References Cited

U.S. PATENT DOCUMENTS

| | | | |
|---|---|---|---|
| 4,814,908 | 3/1989 | Schmitz | 360/77.02 |
| 4,858,040 | 8/1989 | Hazebrouck | 360/78.05 |
| 5,189,578 | 2/1993 | Mori et al. | 360/106 |
| 5,216,559 | 6/1993 | Springer | 360/106 |
| 5,303,105 | 4/1994 | Jorgenson | 360/106 |
| 5,359,474 | 10/1994 | Riederer | 360/78.05 |
| 5,367,420 | 11/1994 | Yagi et al. | 360/109 |
| 5,400,192 | 3/1995 | Mizoshita et al. | 360/77.16 |
| 5,408,376 | 4/1995 | Nishikura et al. | 360/109 |
| 5,438,469 | 8/1995 | Rudi | 360/109 |
| 5,521,778 | 5/1996 | Boutaghou et al. | 360/106 |
| 5,535,074 | 7/1996 | Leung | 360/104 |
| 5,539,596 | 7/1996 | Fontana et al. | 360/106 |
| 5,657,188 | 8/1997 | Jurgenson et al. | 360/106 |

FOREIGN PATENT DOCUMENTS

| | | |
|---|---|---|
| 0 549 814 A1 | 7/1993 | European Pat. Off. . |
| 59-203272 | 11/1984 | Japan . |
| 63-291271 | 11/1988 | Japan . |
| 2-227886 | 11/1990 | Japan . |
| 3-69072 | 3/1991 | Japan . |
| 59-96571 | 6/1994 | Japan . |
| 7-201148 | 8/1995 | Japan . |
| WO 93/02451 | 2/1993 | WIPO . |

OTHER PUBLICATIONS

Tang, et al., "Silicon Micromachined Electromagnetic Microactuators For Rigid Disk Drives," submitted for presentation at the INTERMAG Conference, Apr. 1995, 2 pages.

Tang et al., "Design, Fabrication and Testing of Micromachined Electromagnetic Microactuators for Rigid Disk Drives," submitted for presentation at the Transducer '95 Conference, Apr. 1995, 2 pages.

Temesvary, et al., Design, Fabrication and Testing of Silicon Microgimbals for Super–Compact Rigid Disk Drives, IEEE/ASME J. of MEMS, Dec. 1994, pp. 1–26.

Miu, et al., "Silicon Microgimbals for Super–Compact Magnetic Recording Rigid Disk Drives," Adv. Info. Storage Syst., vol. 5, 1993, pp. 139–152.

Wu, et al, Silicon Micromachined Integrated Suspension Systems for 30% Read/Write Pico–Sliders,: submitted for publication in the ASME Journal of Vibration & Acoustics, pp. 1–13, undated.

O'Connor, Microengines go for a Spin,: Mechanical Engineering, Feb. 1995, p. 66.

(List continued on next page.)

*Primary Examiner*—A. J. Heinz
*Attorney, Agent, or Firm*—Faegre & Benson LLP

[57] ABSTRACT

A disk drive suspension for mounting to the end of an actuator arm. The suspension includes a load beam having a base at a proximal end, a rigid region, a spring region between the rigid region and the base, a flexure for receiving and supporting a read/write head on a distal end of the load beam, a moving section, and a stationary section. The moving section is supported from the stationary section by at least 2 transversely extending resilient support beams. The support beams allow the moving section to pivot with respect to the stationary section. A microactuator is located on the load beam to pivot the moving section and shift the flexure including the read/write head along a transverse tracking axis in response to tracking control signals.

35 Claims, 20 Drawing Sheets

OTHER PUBLICATIONS

O'Connor, "Miniature motors for future PCs," Mechanical Engineering, Feb. 1995, pp. 63–65.

Miu, et al., "Silicon Micromachined SCALED Technology", 1993 JSME International Conference on Advanced Mechatronics, Tokyo, Japan, Aug. 1993, pp. 527–532.

Mori, et al., A Dual–Stage magnetic Disk Drive Actuator Using a Piezoelectric Device for a High Track Density,: IEEE Transactions on Magnetics, Nov. 1991, vol. 27, No. 6, pp. 5298–5300.

Miu, et al. "Silicon Microstructures and Microactuators for Compact Computer Disk Drivers," IEEE Control Systems, Dec. 1994, pp. 52–57.

Microactuator–related materials published at a National Storage Industry Consortium meeting, 18 pages.

Wu, et al, "Silicon micromachined integrated suspension systems for magnetic disk drives", Elsevier Science S.A., 1996, pp. 195–200.

Knight et al. "Design and Testing of Suspension With Integrated Magnetic Microactuator", presented Jul. 1996 at IBM Almaden Research Center, pp. 1–7.

Miu, "Microactuators for Rigid Disk Drives", published in Jul./Aug. 1995 issue of DATA STORAGE magazine and in Jan. 1996 issue of Japanese Journal of Applied Physic, pp. 1–14.

Senturia, "The future of microsensor and microactuator design", Elsevier Science, S.A. 1996, pp. 125–127.

Fujita, "Future of actuators and microsystems", Elsevier Science S.A. 1996, pp. 105–111.

Brysek, "Impact of MEMS technology on society", Elsevier Science S.A. 1996, pp. 1–9.

Miu, "Silicon Microstructures and Microactuators for Compact Computer Disk Drives", http://www.computer.org/conferen/mss95/miu/miu.htm web site pp. 1–13, Nov. 8, 1995.

Koganezawa, et al., "A Flexural Piggyback Milli–Actuator for Over 5 Gbit/in Density Magnetic Recording", IEEE, Transactions on Magnetics, vol. 32 No. 5, Sep. 1996 pp. 3908–3910.

BASE PLATE-MOUNTED MICROACTUATOR FOR A SUSPENSION

BACKGROUND OF THE INVENTION

1. Field of the Invention

The present invention relates generally to suspensions for supporting read/write heads over recording media. In particular, the present invention is a head suspension assembly having a microactuator mounted on the base plate.

2. Description of the Related Art

Disk drives include disk drive suspensions for supporting read/write heads over information tracks of rotating disks. The well known and widely used Watrous-type suspensions include a load beam having a mounting region on a proximal end, a flexure on a distal end, a relatively rigid region adjacent to the flexure and a spring region between the mounting region and rigid region. An air-bearing slider which includes the read/write head is mounted to the flexure. The mounting region is typically attached to a base plate for mounting the load beam to an actuator arm. A motor which is controlled by a servo control system rotates the actuator arm to position the read/write head over desired information tracks on the disk. This type of suspension is used with both magnetic or non-magnetic disks.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track.

The use of head suspensions having microactuators or fine tracking motors has been proposed to overcome these problems. One such suspension is disclosed in U.S. patent application Ser. No. 08/457,432 (U.S. Pat. No. 5,657,188) filed Jun. 6, 1995 by Jurgenson et al. entitled Head Suspension with Tracking Microactuator which is assigned to Hutchinson Technology Incorporated, the assignee of the present application.

There is, however, a continuing need for improved head suspensions having microactuators. In particular, the head suspension/microactuator combination must be capable of quickly and accurately positioning the read/write head. The head suspension/microactuator should also be light weight to minimize detrimental effects on the resonance characteristics of the suspension, and relatively thin to enable close disk-to-disk spacing. To be commercially viable the head suspension/microactuator must also be reliable and capable of being efficiently manufactured.

SUMMARY OF THE INVENTION

The present invention is a head suspension with a microactuator which is light weight, low-profile, and efficient-to-manufacture. Further the head suspension/microactuator combination is capable of quickly and accurately positioning the read/write head. One embodiment of the present invention includes a disk drive suspension having a load beam formed from a single sheet of material with a base at a proximal end, a rigid region adjacent to a distal end, and a spring region between the base and the rigid region. The load beam also has a moving section, and a stationary section. A flexure for receiving and supporting a read/write head is located at the distal end of the load beam. A linkage couples the moving section to the stationary section and includes at least two transversely extending resilient members located between the flexure and the proximal end of the load beam. A flexure for supporting a read/write head is attached to the flexure mounting region. A microactuator is also mounted on the load beam. In response to tracking control signals, the microactuator shifts the moving section of the load beam including the flexure along a tracking axis with respect to the stationary section.

In another embodiment, the linkage coupling the moving section of the load beam to the stationary section includes at least three resilient members. Also, the microactuator is located on the mounting region of the load beam.

DETAILED DESCRIPTION OF THE PREFERRED EMBODIMENTS

Figure 1A:
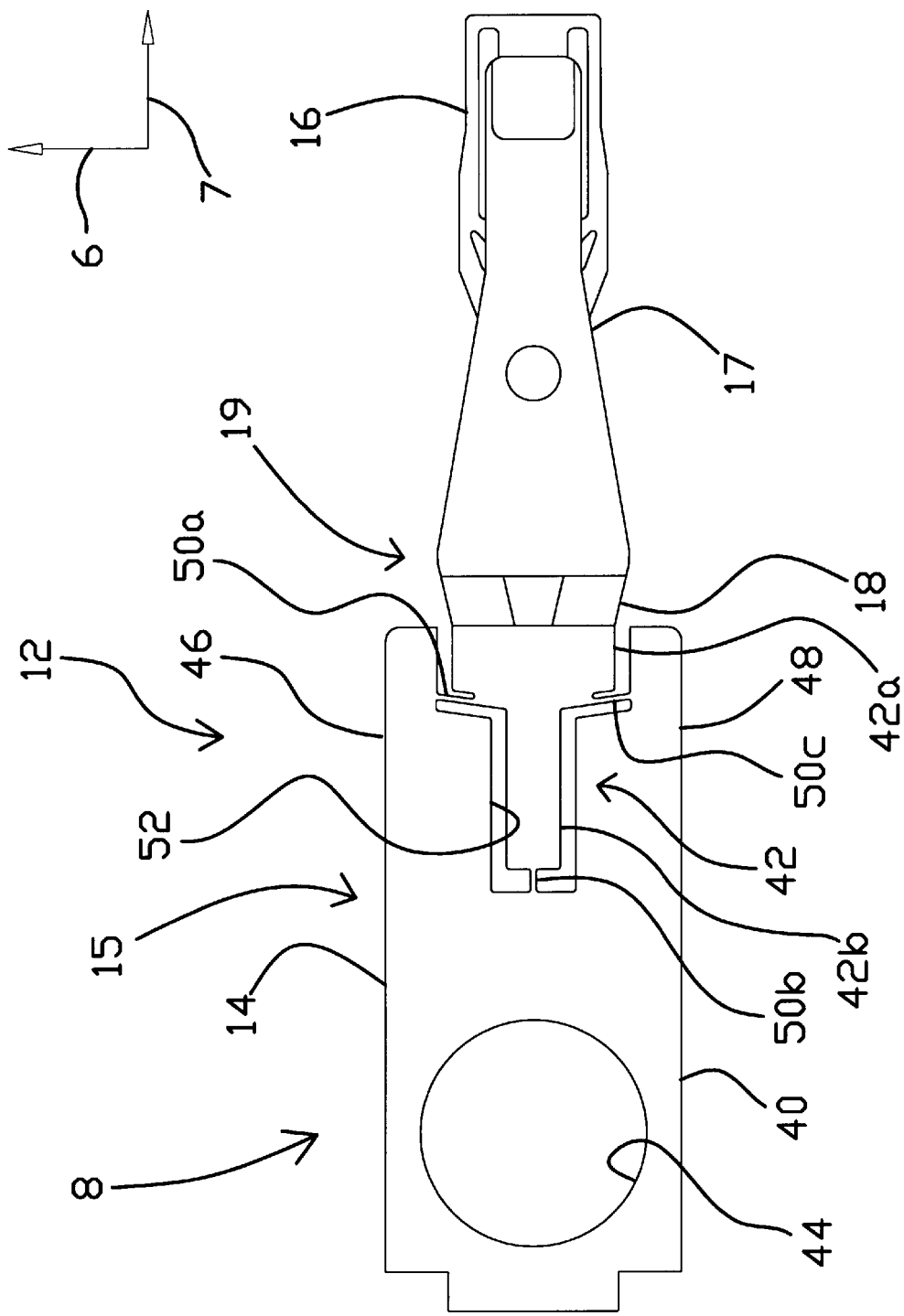
FIG. 1a is a top view of a head suspension in accordance with the present invention.

A head suspension 8 adapted to accommodate a microactuator and in accordance with the present invention is illustrated generally in FIG. 1a. As shown, suspension 8 includes a load beam 12 having an extended base or mounting region 14 on a proximal end, a flexure 16 on a distal end, a relatively rigid region 17 adjacent to the flexure, and a radius or spring region 18 between the mounting region 14 and rigid region 17. Load beam 12 can be fabricated and formed from a sheet of stainless steel or other resilient material in a conventional manner.

A spring connection is provided between a head slider (not shown) and the distal end of load beam 12 by flexure 16 which permits the head slider to move in pitch and roll directions so that it can compensate for fluctuations of a spinning disk surface above which the slider "flies." Many different types of flexures, also known as gimbals, are known to provide the spring connection allowing for pitch and roll movement of the head slider and can be used with the present invention.

Head suspension 8 has a stationary section 15 and a moving section 19. In the embodiment of FIG. 1a, moving section 19 includes flexure 16, rigid region 17, spring region 18, and a moving portion 42 of mounting region 14. Stationary section 15 includes a stationary portion 40 of mounting region 14. Stationary portion 40 has a circular opening 44 to facilitate attachment of mounting region 14 to an actuator arm (not shown). Stationary portion 40 also has first longitudinally extending arm 46 and second longitudinally extending arm 48. Moving portion 42 of mounting region 14 is generally T-shaped having a member 42a extending transversely in a direction generally parallel to transverse axis 6 and member 42b extending longitudinally in a direction generally parallel to longitudinal axis 7 and perpendicular to member 42a. Member 42b is adjacent to spring section 18. Moving portion 42 is suspended between arms 46 and 48 by support beams 50a, 50b, and 50c. A generally U-shaped gap 52 extends between stationary portion 40 and moving portion 42.

Support beams 50a, 50b and 50c function as a resilient members and as a linkage between moving portion 42 and stationary portion 40. Support beam 50a is elongated and extends across gap 52 in a direction generally parallel to transverse axis 6 and between arm 46 and member 42a of moving portion 42. Support beam 50c is elongated and extends across gap 52 in a direction generally parallel to transverse axis 6 and between arm 48 and member 42a of moving portion 42. Support beam 50b is elongated and extends across gap 52 in a direction generally parallel to longitudinal axis 7 and between the stationary portion 40 and moving portion 42. As such, supports beams 50a, 50b and 50c are located between the spring region 18 and the proximal end of the load beam 12 with support beam 50b being between support beams 50a and 50b and the proximal end of load beam 12.

Resilient support beams 50a, 50b, and 50c allow moving portion 42 to pivot or move laterally in a tracking direction with respect to stationary portion 40 about a point on moving portion 42. As noted above, spring region 18, rigid region 17, distal end of load beam 12, and flexure 16 are attached to the moving section 42 of mounting region 14. Accordingly, support beams 50a, 50b, and 50c allow the distal end of the load beam 12 including the flexure 16 to pivot or otherwise move about tracking axes 90 and 92 with respect to the stationary portion 40 of the suspension 8 as shown in phantom in FIG. 1b.

Figure 4:
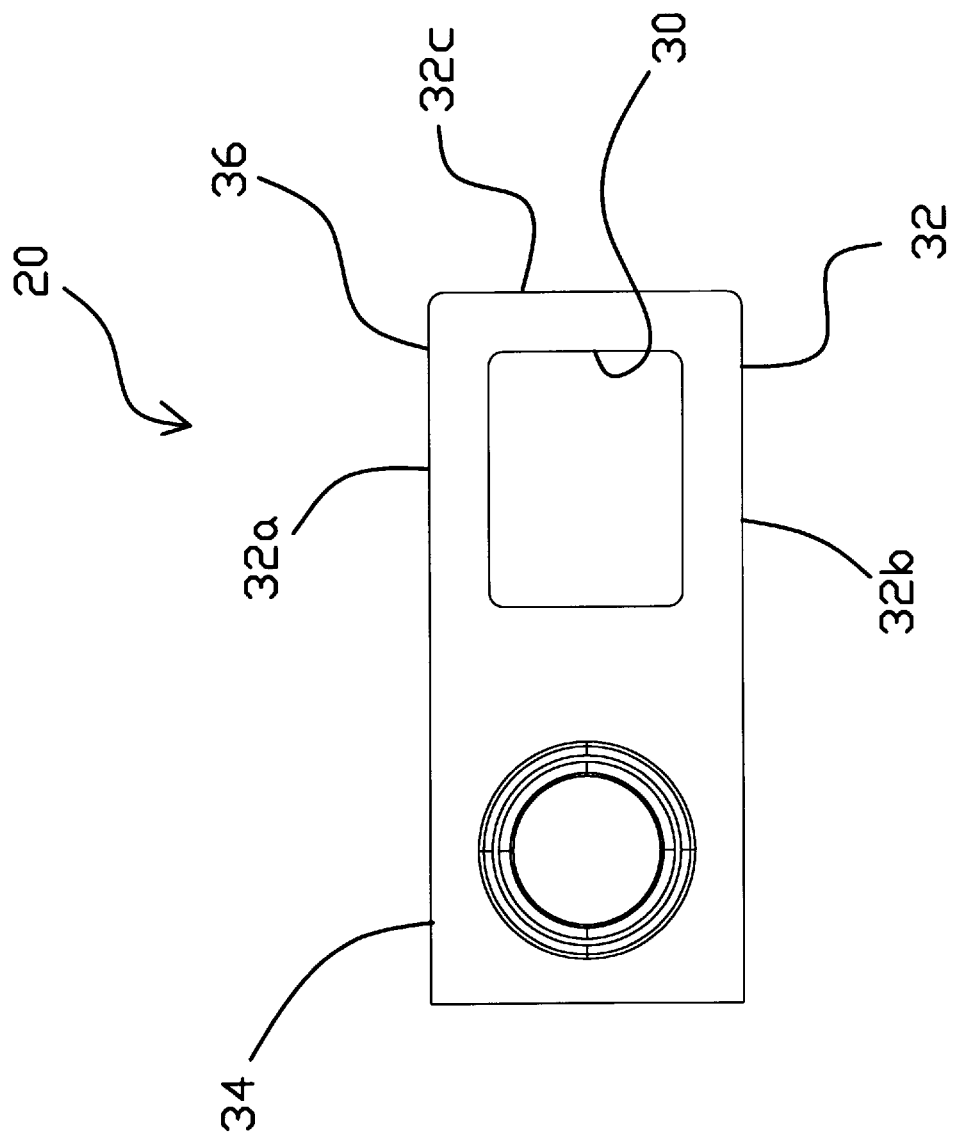
FIG. 4 is a top view of the extended base plate shown in FIG. 3.

Mounting region 14 is mounted onto extended base plate 20, shown in FIG. 4, which has a proximal end 34 and a distal end 36. Proximal end 34 is configured for attaching base plate 20 to an actuator arm (not shown). Distal end 36 includes a rectangular opening 30 around which member 32 extends. Crossmember 32c of member 32 extends perpendicularly between side arms 32a and 32b of member 32 to increase the lateral stiffness of side arms 32a and 32b. Base plate 20 is preferably manufactured from stainless steel.

Figure 3:
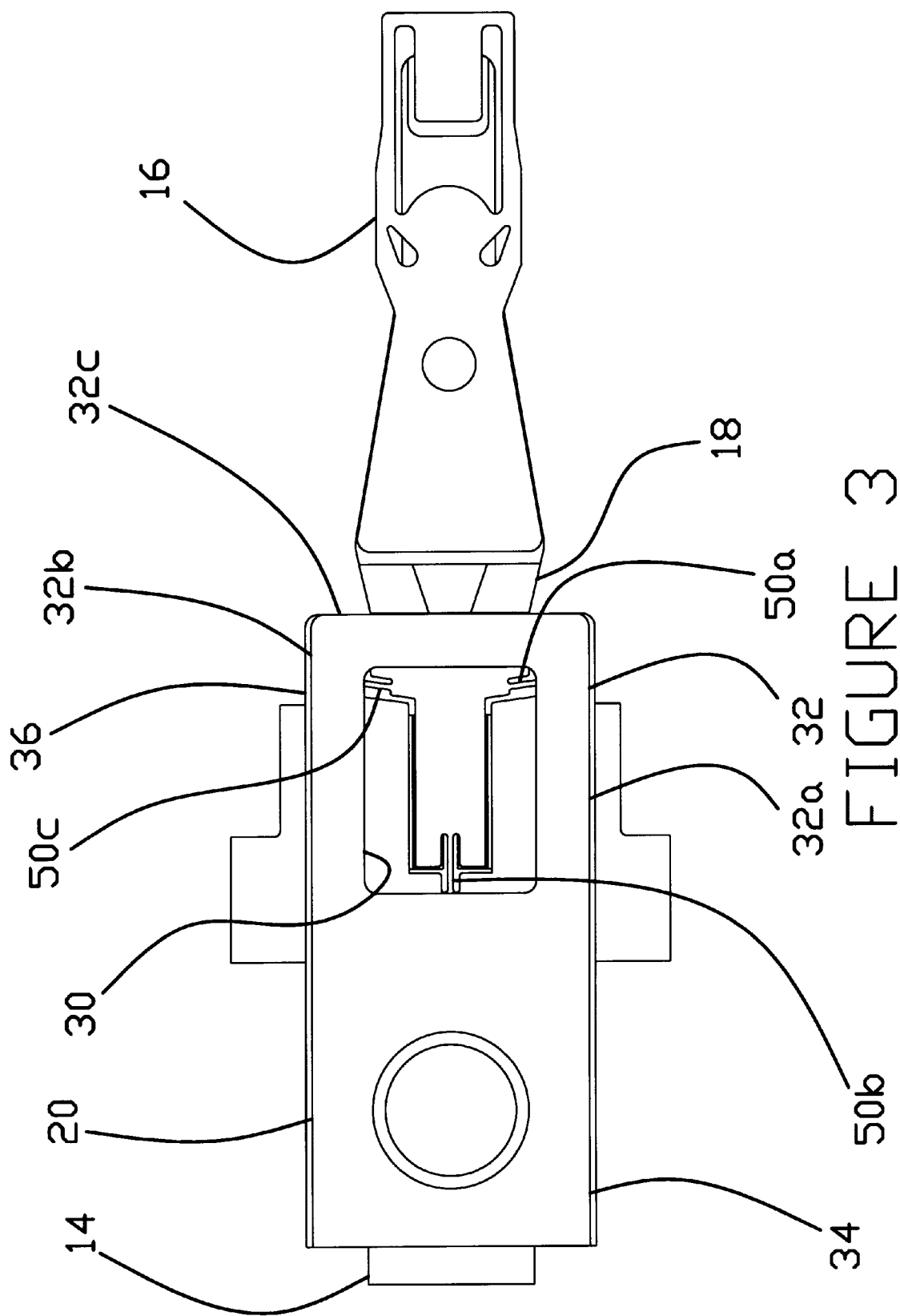
FIG. 3 is a bottom view of the head suspension, microactuator, and extended base plate shown in FIG. 2.

Mounting region 14 of load beam 12 is mounted to the top surface base plate 20 by welding or other means known in the art. As shown in FIG. 3, which is a bottom view of head suspension 8 mounted to extended base plate 20, sidemember 32a is sized to extend beneath and support arm 46 and sidemember 32b is sized to extend beneath and support arm 48. In this way, crossmember 32c increases the lateral rigidity of arms 46 and 48.

Figure 5:
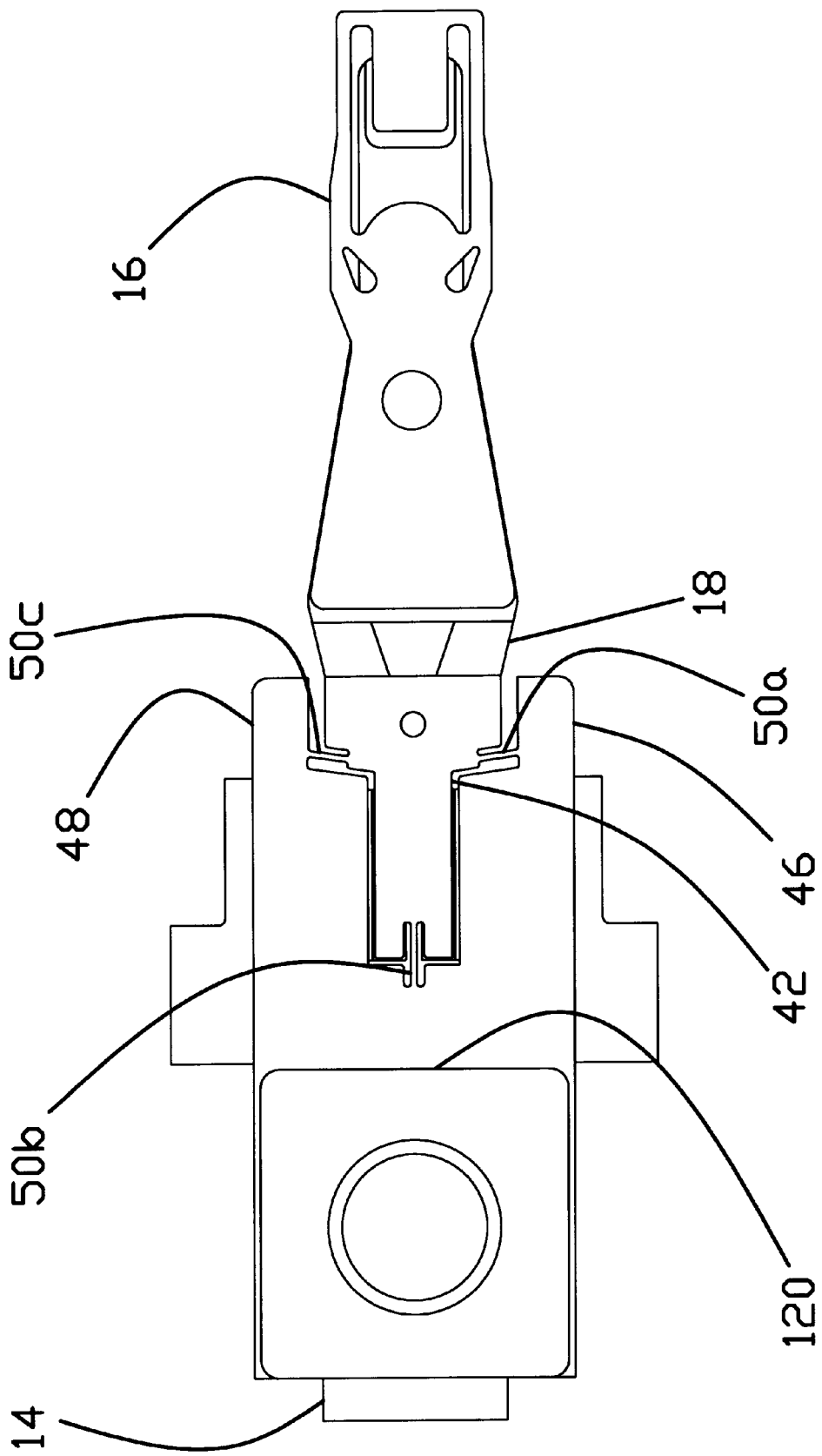
FIG. 5 is a bottom view of the head suspension and microactuator shown in FIG. 2 mounted to a non-extended base plate in accordance with a second embodiment of the present invention.

FIG. 5 shows another embodiment of the present invention. Elements shown in FIG. 5 identical to those shown in FIG. 1a are labeled with identical numerals and elements shown in FIG. 5 functionally similar to those shown in FIG. 1a are labeled with like numerals incremented by 100. In the embodiment shown in FIG. 5, which is a bottom view of head suspension 8 mounted to a base plate 120, base plate 120 is shorter than base plate 20 shown in FIG. 4, is generally square in shape rather than rectangular, and does not include member 32 or support arms 32a, 32b and 32c. Head suspension 8 can be mounted to base plate 120 by adhesive, welding, or any other known processes.

Figure 6:
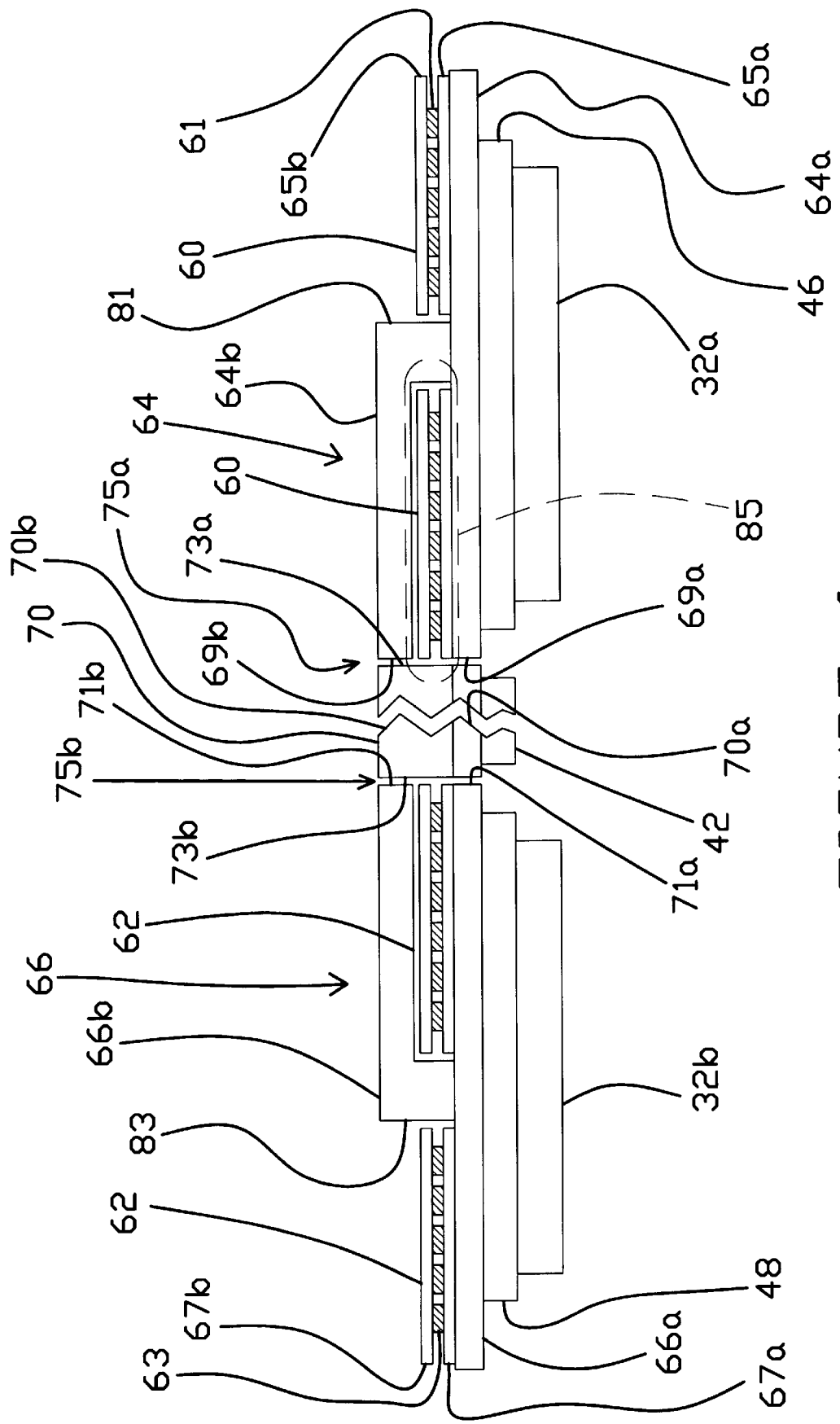
FIG. 6 is a sectional view of the head suspension, microactuator, and base plate shown in FIG. 2 taken along line 6—6.

Microactuator 10 can be described in greater detail with reference to FIGS. 2 and 6. In the embodiment shown in FIG. 2, microactuator 10 is an electromagnetic device located on the mounting region 14 of load beam 12 and includes a first magnetic field generating coil 60 and a second magnetic field generating coil 62.

First magnetic field generating coil 60 is located on the stationary portion 40 of the mounting region 14 over first longitudinally extending arm 46. As shown in FIG. 6, which is a sectional view of load beam 12 shown in FIG. 2 taken along line 6—6, first magnetic field generating coil 60 is formed from electrically conducting lead 61 which is sandwiched between lower electrically insulating layer 65a and upper electrically insulating layer 65b. In the embodiment shown in FIGS. 2 and 6, lead 61 is configured in a rectangular spiral having 5 arms on an exterior edge of microactuator 10 and 6 arms on an interior edge of microactuator 10. Other configurations of lead 61 are also within the ambit of the present invention.

One end of lead 61 is connected to electrical contact 72a and the other end of lead 61 is connected to electrical contact 74a. Both contacts 72a and 74a are supported by tab 80a to allow connection of electrical lead 61 to a servo control system (not shown) to enable lead 61 to receive tracking control signals.

Second magnetic field generating coil 62 is located on the stationary portion 40 of mounting region 14 over second longitudinally extending arm 48. Second magnetic field generating coil 62 is formed from electrically conducting lead 63 which is sandwiched between lower electrically insulating layer 67a and upper electrically insulating layer 67b. In the embodiment shown in FIG. 2, lead 63 is configured in a rectangular spiral having 5 arms on an exterior edge of microactuator 10 and 6 arms on an interior edge of microactuator 10. Other configurations of lead 63 are also within the ambit of the present invention.

One end of lead 63 is connected to electrical contact 72b and the other end of lead 63 is connected to electrical contact 74b. Both contacts 72b and 74b are supported by tab 80b to allow connection of electrical lead 62 to a servo control system (not shown) to enable lead 62 to receive tracking control signals.

Leads 61 and 63, and contacts 72a, 72b, 74a, and 74b are preferably formed of copper, though they can also be formed of other electrically conducting material. Insulating layers 65a, 65b, 67a, and 67b are preferably formed of polyimide though they can also be formed of other electrically insulating material.

Microactuator 10 also includes first stationary pole 64 and second stationary pole 66. First stationary pole 64 includes a first lower pole member 64a and a first upper pole member 64b. First lower pole member 64a is generally rectangular with a smaller rectangular protrusion which forms tab 80a First lower pole member 64a is supported by first longitudinally extending arm 46. First upper pole member 64b is mounted by adhesive or other known means to first lower pole member 64a along a strip 81 in a center region of first magnetic field generating coil 60. The remainder of first upper pole member 64b is cantilevered from strip 81 to extend over a portion of first magnetic field generating coil 60 without contacting coil 60. An edge 69b of first upper pole member 64b and an edge 69a of first lower pole member 64a are aligned with one another in a plane extending perpendicularly to the surface of base 14 and adjacent to the moving section 42 of mounting region Second stationary pole 66 includes a second lower pole member 66a and a second upper pole member 66b. Second lower pole member 66a is generally rectangular with a smaller rectangular protrusion which forms tab 80b. Second lower pole member 66a is supported by second longitudinally extending arm 48. Second upper pole member 66b is mounted by adhesive or other known means to second lower pole member 66b along a strip 83 in a center region of second magnetic field generating coil 62. The remainder of second upper pole member 66b is cantilevered from strip 83 to extend over a portion of second magnetic field generating coil 62 without contacting coil 62. An edge 71b of second upper pole member and an edge 71a of second lower pole member are aligned with one another in the same vertical plane adjacent to the moving section 42 of mounting region 14.

First stationary pole 64 and second stationary pole 66 can be formed of any material having relatively high magnetic permeability. In the embodiment shown in FIGS. 2 and 6, stationary poles 64 and 66 are formed of NiFe.

Microactuator 10 also includes a moving pole 70. Moving pole 70 is generally rectangular in shape and mounted on top of member 42b of moving section 42 of mounting region 14 between stationary poles 64 and 66. Edge 73a of moving pole 70 is adjacent to edges 69a and 69b of first stationary pole 64 to form gap 75a between moving pole member 70 and first stationary pole 64. Edge 73b is laterally opposite to edge 73a and is adjacent to edges 71a and 71b of second stationary pole 66 to form gap 75b between moving pole member 70 and second stationary pole 66.

Figure 1B:
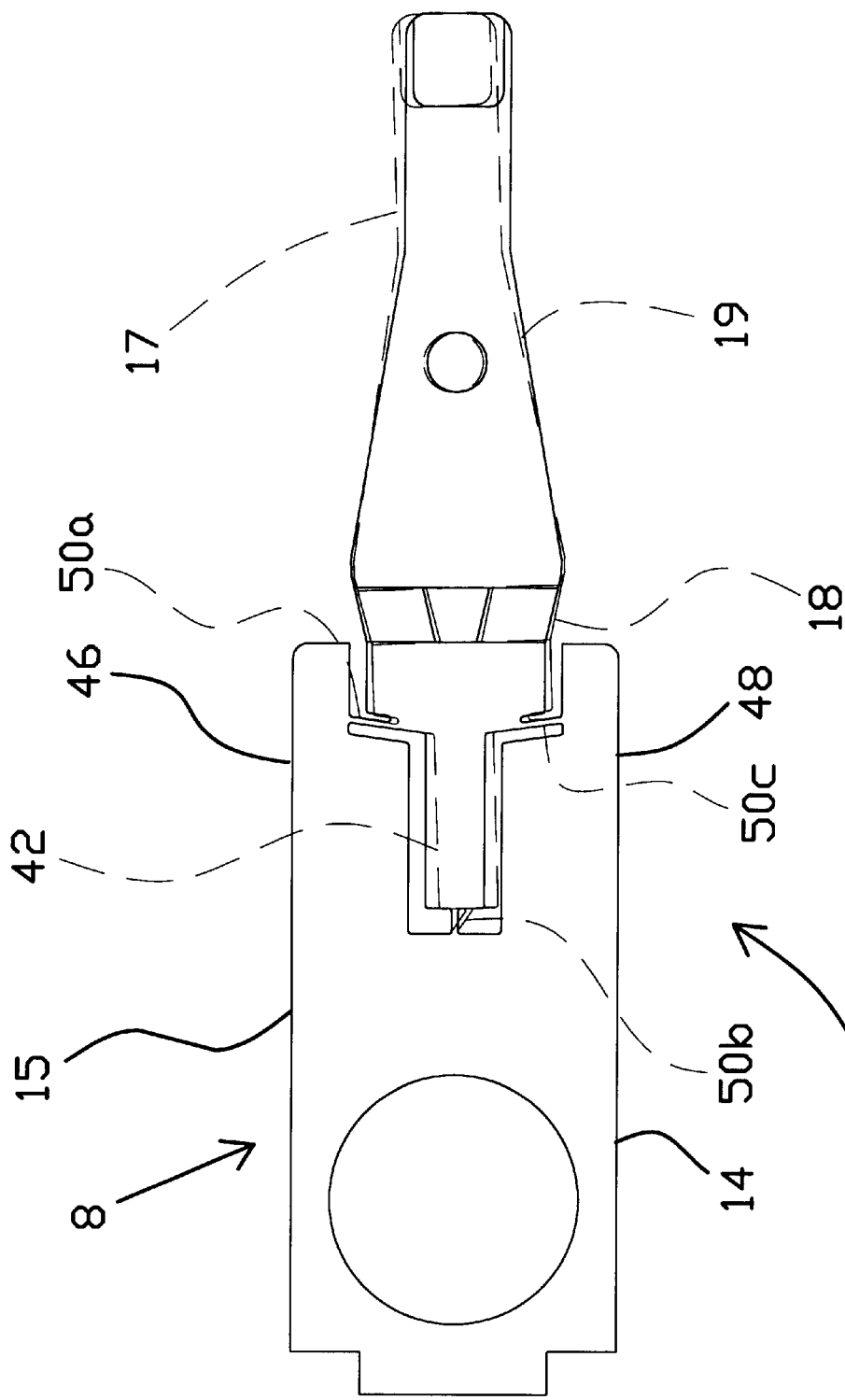
FIG. 1b is a top view of the head suspension shown in FIG. 1a with the load beam shown in shifted position in phantom.

As noted above, suspension 8 is configured to have a slider with a read/write head (not shown) adhesively bonded or otherwise mounted to flexure 16 to form a head suspension assembly. The head suspension assembly is configured to be mounted to an actuator arm of a magnetic disk drive (not shown) to support the slider over the surface of a magnetic disk. Applying tracking control signals to lead 61 energizes first magnetic field generating coil 60 which induces a magnetic field 85 in stationary pole 64 and moving pole 70 as shown diagramatically in phantom in FIG. 6. Magnetic field 85 produces a force tending to move moving pole 70 towards stationary pole 64. Because moving pole 70 is mounted to moving section 42 of mounting region 14, magnetic field 85 causes moving section 42 to shift or move in a pivoting manner, as shown in FIG. 1b, elastically deforming resilient support beams 50a, 50b, and 50c, to move the distal end of load beam 12 including flexure 16 from its neutral position along a transverse tracking axis 90. Motion of flexure 16 along tracking axis 90 is generally perpendicular to the information tracks on the magnetic disk (not shown). Similarly, tracking control signals can be applied to lead 63 to energize magnetic field generating coil 62 to pull moving pole 70 toward stationary pole 66 and move flexure 16 along tracking axis 92. The resilient nature of support beams 50a, 50b, and 50c urges flexure 16 back to its neutral position when magnetic field generating coils 64 and 66 are not energized.

Accordingly, microactuator 10 functions as a fine tracking actuator. In response to tracking control signals, microactuator 10 drives and positions flexure 16, and therefore the slider and read/write head mounted thereto, with respect to individual information tracks on the disk. The magnitude of the tracking control signals are controlled by the servo system to control the extent of motion the flexure 16 from its neutral position.

Resilient members 50a, 50b, and 50c allow load beam 12 to remain relatively rigid in a direction perpendicular to the plane of the load beam while still allowing lateral movement of the moving section 19 of load beam 12. Rigidity in a direction perpendicular to the load beam is important to maintain appropriate slider fly height over a spinning magnetic disk. Further, the moving section 19 responds relatively quickly to tracking control signals because the moving section 19 is supported by members 50a, 50b and 50c and "floats" above extended base plate 20 so that friction between moving section 19 and stationary section 15 is reduced. Quick response time is important for quick data retrieval from, and deposit to, a magnetic disk. Also, because microactuator 10 is located between the spring region 18 and the proximal end of load beam 12, rather than nearer to the read/write head, the likelihood that microactuator tracking signals will interfere with read/write processes is reduced.

A method for fabricating head suspension 8 including microactuator 10 can be described with reference to FIGS. 6 and 7. Load beam 12 including mounting region 14, spring region 18, and rigid region 17 is formed from a single sheet of stainless steel (not shown) or other resilient material. The sheet is chemically etched or otherwise cut to have the dimensions of load beam 12.

Gap 52 is chemically etched or otherwise cut to form resilient arms 50a, 50b, and 50c and moving portion 42 of mounting region 14.

Figure 20:
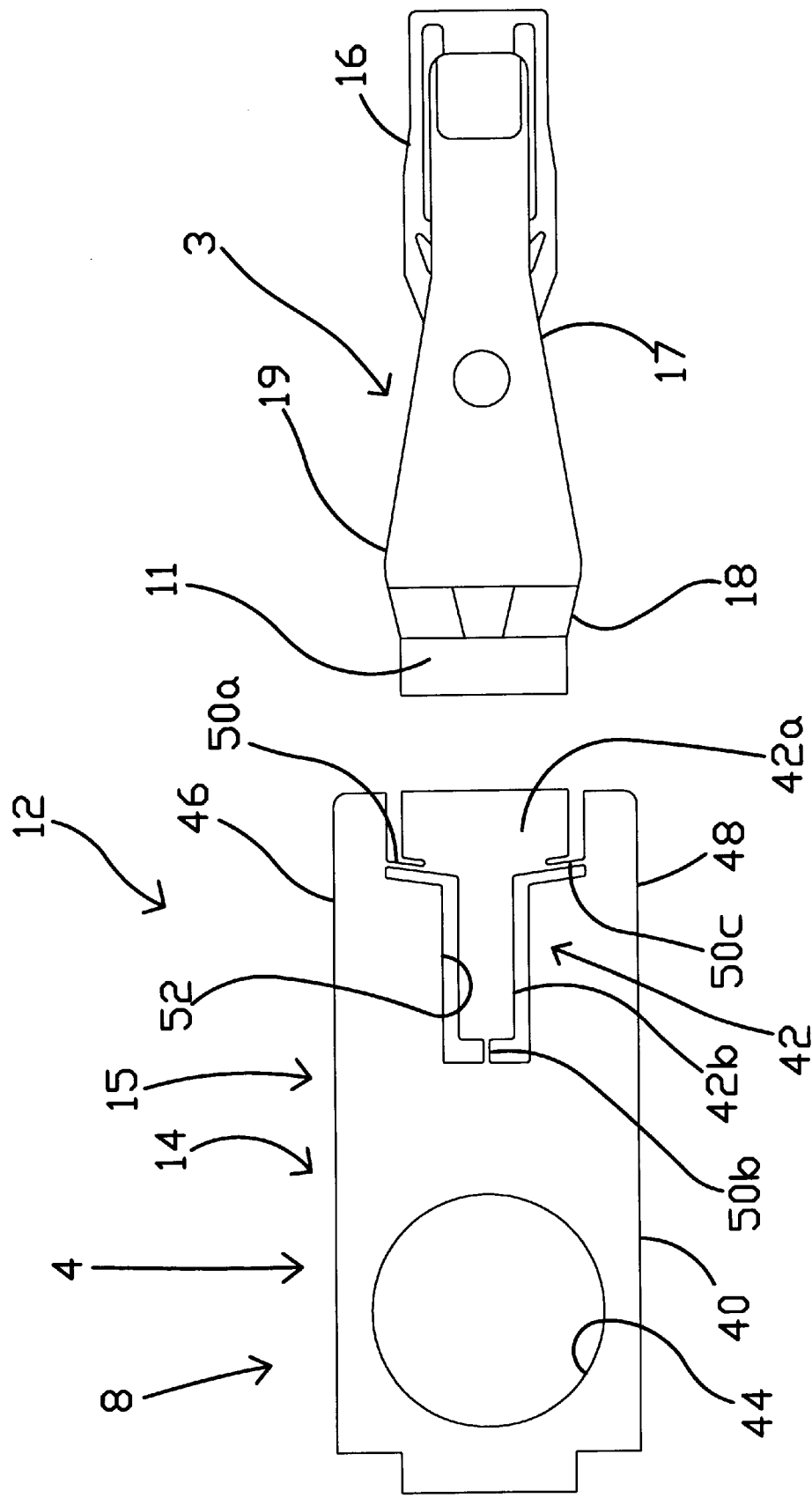
FIG. 20 is a top view of the head suspension shown in FIG. 1a including a proximal section formed separately from a distal section.

Alternatively, as shown in FIG. 20, load beam 12 can be formed from a distal section 3 and a proximal section 4. Distal section 3 includes spring region 18 rigid region 17 and a mounting portion 11. Proximal section 4 includes mounting region 14 with moving portion 42 and stationary portion 40. Distal section 3 and proximal section 4 can be formed separately from a sheet of stainless steel (not shown) or two separate sheets of stainless steel. Other types of resilient material can also be used. The stainless steel is chemically etched or otherwise cut to have dimensions of distal section 3 and proximal section 4, respectively. Gap 52 is chemically etched or otherwise cut in proximal section 4 to form resilient arms 50a, 50b, and 50c and moving portion 42. Distal section 3 and proximal section 4 are then attached by adhesive, welding, or other known processes.

Figure 7:
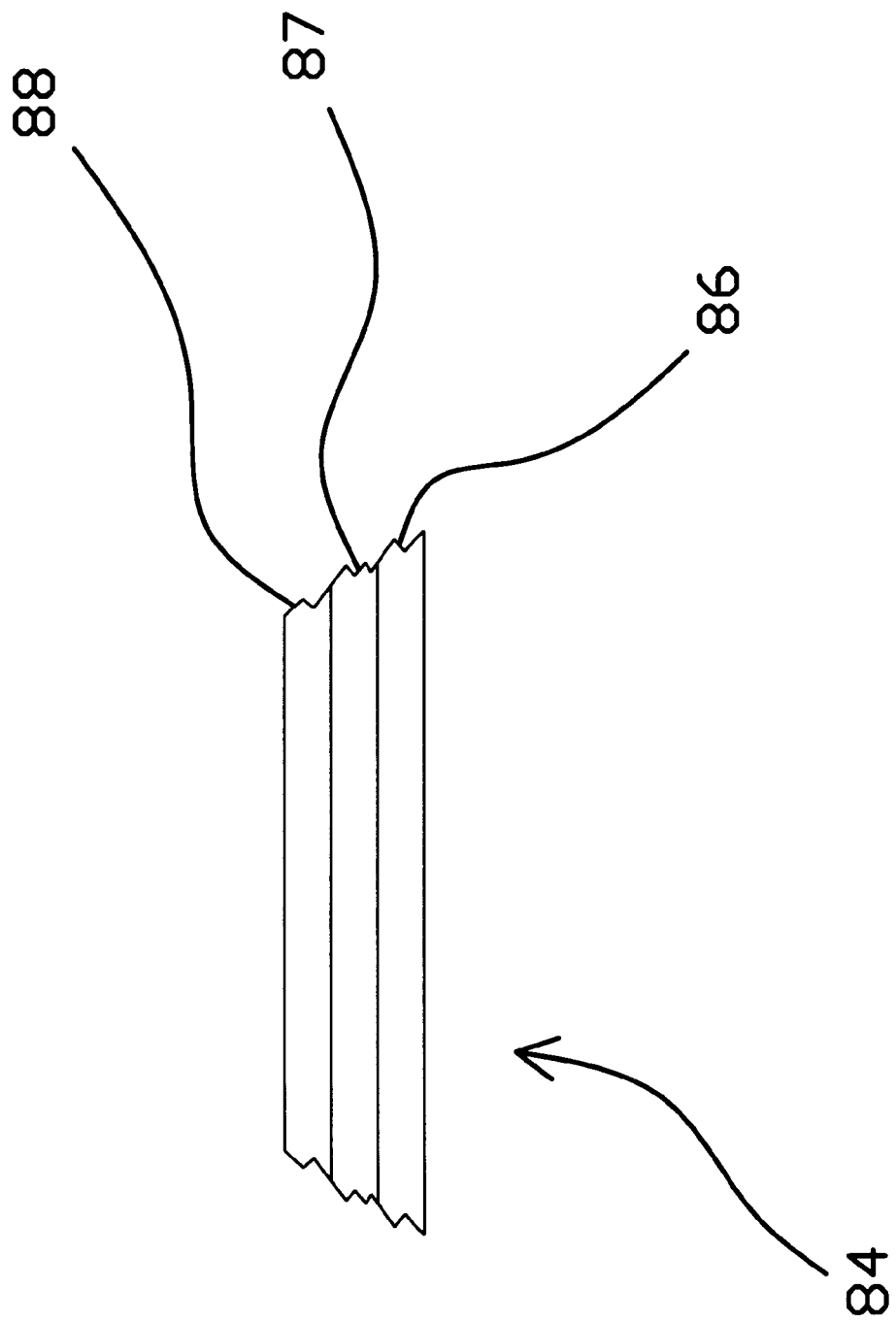
FIG. 7 is a side view illustration of laminated sheet material from which the microactuator shown in FIG. 2 can be fabricated.

Microactuator 10 is partially formed from a laminated sheet 84, illustrated in FIG. 7, which has three layers; a first layer 86 of NiFe or other material having a relatively high magnetic permeability, a second layer 87 of polyimide or other electrically insulating material, and a third layer 88 of copper or other electrically conducting material. Laminated sheet 84 is chemically etched or otherwise cut into a sheet having the dimensions of microactuator 10 including lower stationary pole members 64a and 66a, lower moving pole section 70a, and tabs 80a and 80b. Laminated sheet 84 is then chemically etched to form lower insulating layers 65a and 67a, leads 61 and 63, and contacts 72a, 72b, 74a, and 74b. Leads 61 and 63 and contacts 72a, 72b, 74a, and 74b can then be coated with a gold to prevent deterioration. Insulating layers 65b and 67b of coils 60 and 62 are formed from a sheet of polyimide (not shown) which is chemically etched or otherwise cut to appropriate dimensions to cover coils 60 and 62 and mounted on top of leads 61 and 63 by adhesive or other known means.

The sheet, including lower stationary pole members 64a and 66a, magnetic field generating coils 60 and 62, lower moving pole section 70a, and tabs 80a and 80b, is mounted by adhesive or other known means to an upper face of mounting region 14 of load beam 12. Lower stationary pole member 64a is attached to arm 46, lower stationary pole member 66a is attached to arm 48, and lower moving pole section 70a is mounted to moving portion 42.

A sheet of NiFe or other magnetically permeable material (not shown) is chemically etched or otherwise cut to form a sheet and upper dimensions of upper stationary pole members 64b, 66b, and upper moving pole member 70b. This sheet is then chemically etched to form strips 81 and 83 and upper moving pole member 70b. This sheet is then mounted, at strips 81 and 83 and upper moving pole section 70b, to the sheet having the dimensions of lower stationary pole members 64a and 66a and lower moving pole section 70a. The strip is mounted by adhesive or other known means.

Extended base plate 20 is mounted to a bottom face of mounting region 14 by adhesive, welding or other known approaches. Using a laser or other known processes, gaps 75a and 75b are cut in microactuator 10 to form moving pole 70 and stationary poles 64 and 66. Flexure 16 can be attached by adhesive, welding, or other known means to the distal end of load beam 12. Flexure 16 can also have been previously formed unitarily with load beam 12.

Figure 8:
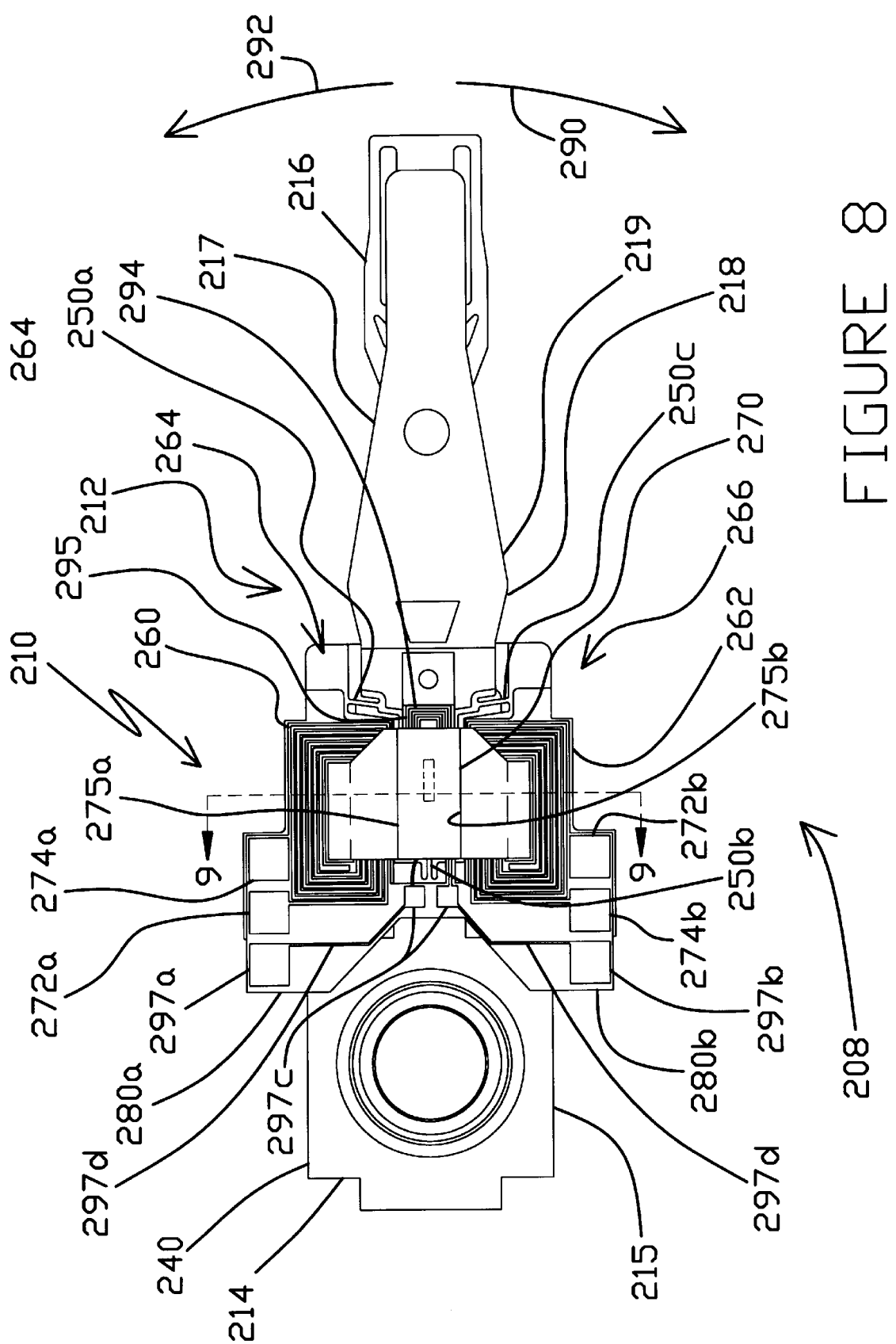
FIG. 8 is a top view of a head suspension and base plate having a microactuator mounted thereon in accordance with a third embodiment of the present invention.
Figure 9:
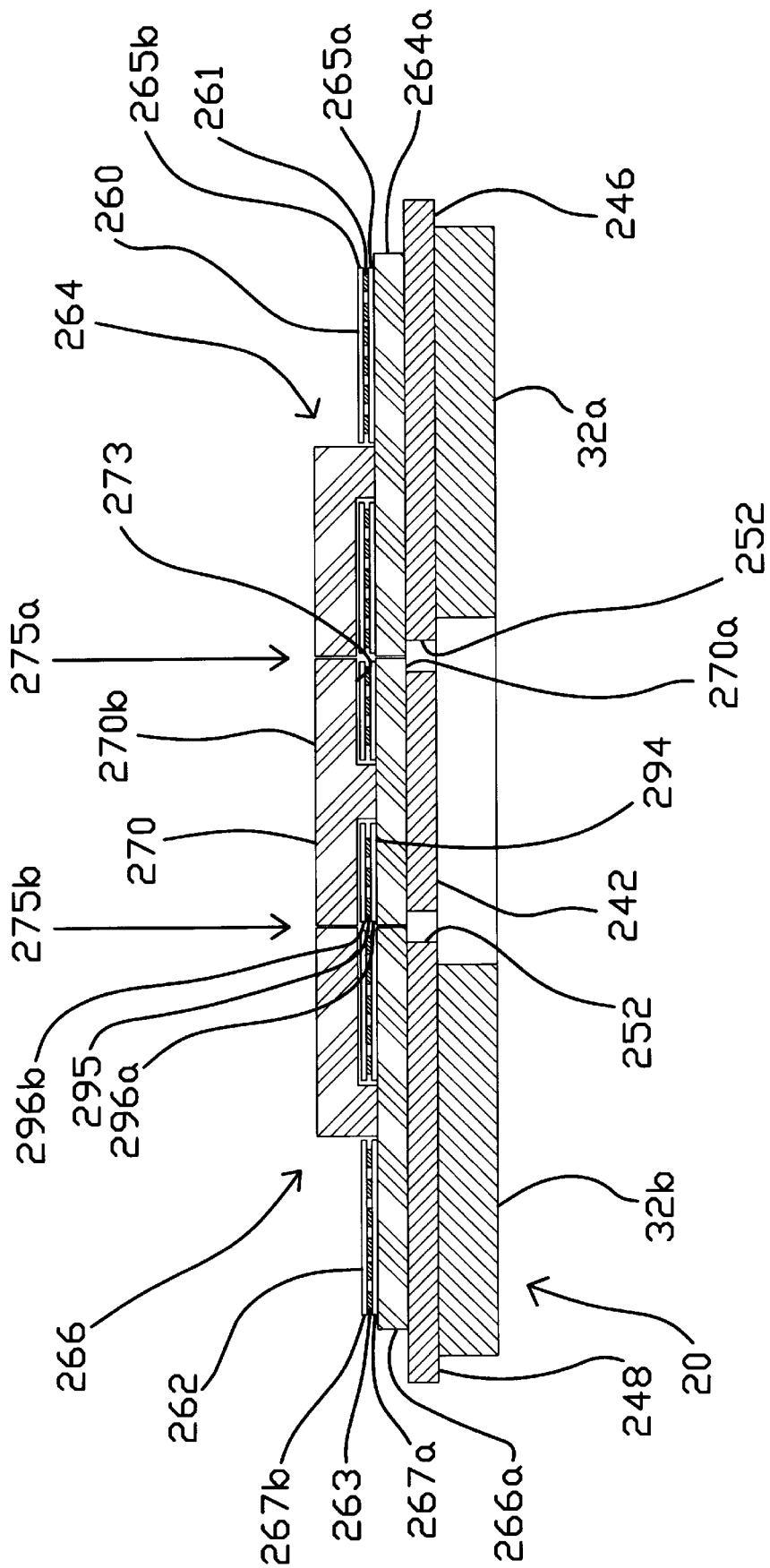
FIG. 9 is a sectional view of the head suspension, microactuator, and base plate shown in FIG. 8 taken along line 9—9.

Another embodiment of the present invention is shown in FIGS. 8 and 9. Elements in FIGS. 8 and 9 which can be identical to those shown in FIGS. 1a, 2, 4, and 6 are labeled with identical numerals and elements in FIGS. 8 and 9 functionally similar to those shown in FIGS. 1a, 2, 4, and 6 are labeled with like numerals incremented by 200. In the embodiment of FIGS. 8 and 9, microactuator 210 is mounted to load beam 212 which is similar to load beam 12 shown in FIG. 1a Head suspension 208 includes load beam 212 and flexure 216 mounted at a distal end thereof Load beam 208 has a stationary section 215 and a moving section 219. Moving section 219 includes flexure 216, rigid region 217, spring region 218, and a moving portion 242 of mounting region 214. Stationary section 215 includes a stationary portion 240 of mounting region 214. Moving portion 242 of mounting region 214 is suspended by support beams 250a, 250b, and 250c from stationary portion 240 to allow moving portion 242 to pivot with respect to stationary portion 240. In the embodiment shown in FIGS. 8 and 9, load beam 212 is mounted to extended base plate 20. Load beam 212 can also be mounted to non-extended base plate 120 shown in FIG. 5.

Microactuator 210 has first magnetic field generating coil 260, second magnetic field generating coil 262, first stationary pole 264, second stationary pole 266, moving pole 270, and moving magnetic field generating coil 294.

As can be seen in FIG. 9, which is a sectional view of load beam 212 with microactuator 210 mounted thereto taken along line 9—9 of FIG. 8, first magnetic field generating coil 260 is similar to first magnetic field generating coil 60 of microactuator 10 and second magnetic field generating coil 262 is similar to second magnetic field generating coil 62 of microactuator 10. Coil 260 is formed from electrically conducting lead 261 sandwiched between a lower electrically insulating layer 265a and an upper electrically insulating layer 265b. Coil 262 is formed from electrically conducting lead 263 sandwiched between a lower electrically insulating layer 267a and an upper electrically insulating layer 267b. Lead 261 is connected to contacts 272a and 274a and lead 263 is connected to contacts 272b and 274b for connection of leads 261 and 263 to a servo control.

A significant structural difference between microactuator 210 and microactuator 10 is that microactuator 210 includes moving magnetic field generating coil 294 on moving pole 270. Coil 294 is formed from electrically conducting lead 295 which is sandwiched between lower electrically insulating layer 296a and upper electrically insulating layer 296b. In the embodiment shown in FIG. 8, lead 295 is configured in a rectangular spiral. Other configurations of lead 295 are also within the ambit of the present invention. One end of lead 295 is connected to electrical contact 297a and the other end of lead 295 is connected to electrical contact 297b. Contact 297a is supported by tab 280a and contact 297b is supported by tab 280b to allow connection of electrical lead 295, through intermediate contacts 297c and lead 297d, to a servo control system (not shown) to enable lead 295 to receive tracking control signals. Cavity 273 is formed between lower moving pole section 270a and upper moving pole section 270b to accommodate moving coil 294.

Moving pole 270 is mounted to moving portion 242 of mounting region 214. First stationary pole 264 is mounted to longitudinally extending arm 246 and second stationary pole 266 is mounted to longitudinally extending arm 248. Gap 275a is formed between first stationary pole 264 and moving pole 270 and gap 275b is formed between second stationary pole 266 and moving pole 270.

In response to tracking control signals generated by a servo controller to energize coils 260, 262, and 294, microactuator 210 moves flexure 216 along either first tracking axis 290 or second tracking axis 292. First stationary coil 260 and moving coil 294 can be simultaneously energized to generate a magnetic field across gap 275a polarized to create an attractive force between moving pole 270 and first stationary pole 264, tending to close gap 275a Simultaneously, coil 262 can be energized to create a repulsive force across gap 275b between second stationary pole 266 and moving pole 270. These forces shift moving portion 242 of mounting region 214 towards arm 246 which, in turn, moves flexure 216 along tacking axis 290. Similarly, magnetic fields can be simultaneously generated in stationary pole 264, 266, and moving pole 270, to create an attractive force across gap 275b between stationary pole 266 and moving pole 270 and a repulsive force across gap 275a between stationary pole 264 and moving pole 270. These forces move moving portion 242 of mounting region 214 towards arm 248 which, in turn, moves flexure 216 along tracking axis 292. Placing moving coil 294 on moving pole 270 allows greater force to be generated between the moving pole 270 and stationary poles 264 and 266. In this way, resilient members 250a, 250b and 250c can be stiffer so that load beam 212 can be provided with greater rigidity.

Microactuator 210 can be fabricated in substantially the same way as microactuator 10 described above. However, when fabricating microactuator 210, the sheet of laminated material 84 shown in FIG. 7 is etched to form not only lower pole members 264a, 266a, and 270a, lower insulating layers 265a and 267a, leads 261 and 263, and tabs 280a and 280b, but also lower insulating layer 296a and lead 295 of moving coil 294. Additionally, upper insulating layer 296b is formed on top of lead 295 and an upper insulating sheet is etched to include cavity 273 to accommodate moving coil 294. Microactuator 210 can be mounted to load beam 212 in the manner described above with reference to mounting microactuator 10 to load beam 12.

Figure 10:
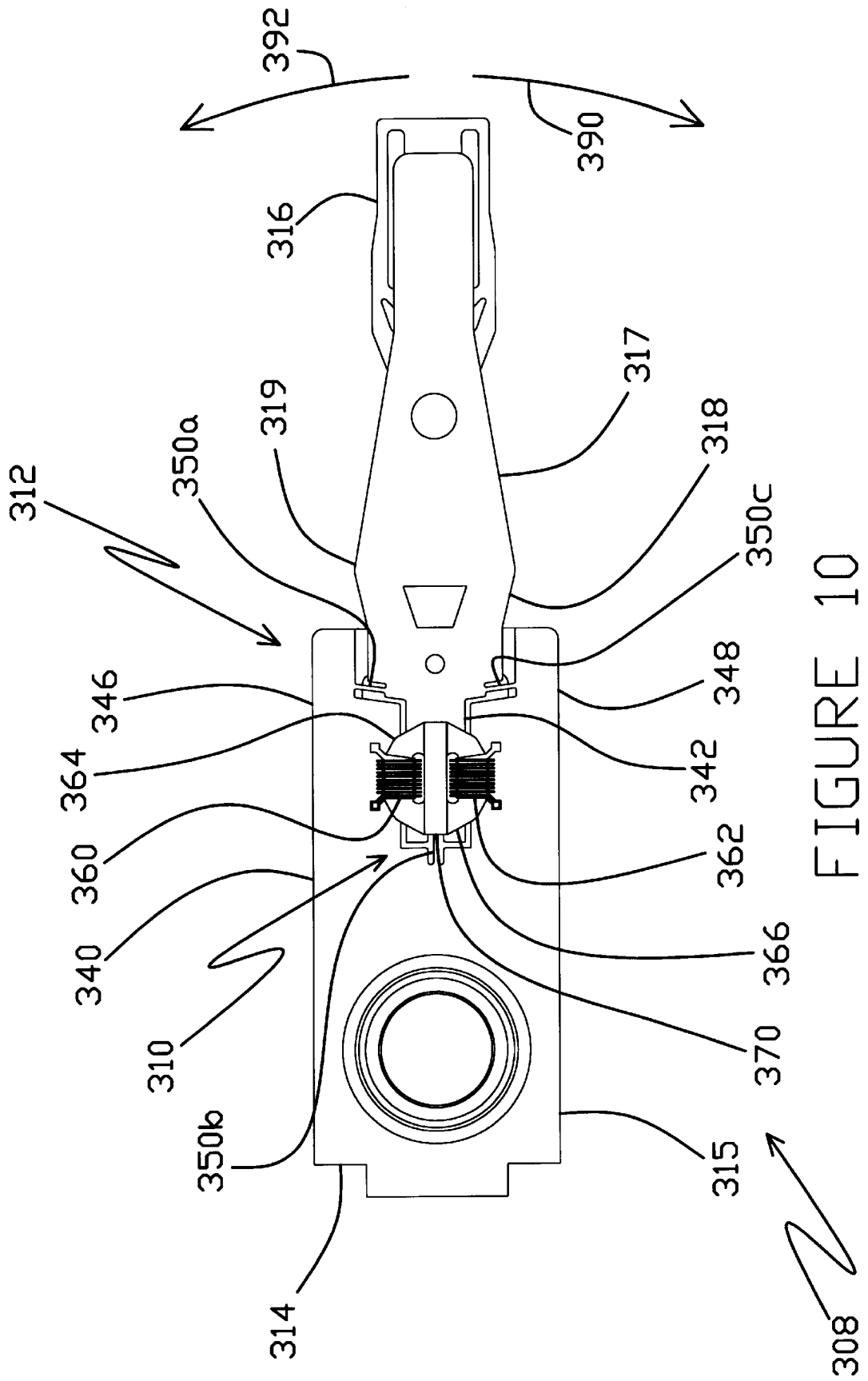
FIG. 10 is a top view of a head suspension and base plate having a microactuator mounted thereon in accordance with a fourth embodiment of the present invention.
Figure 11:
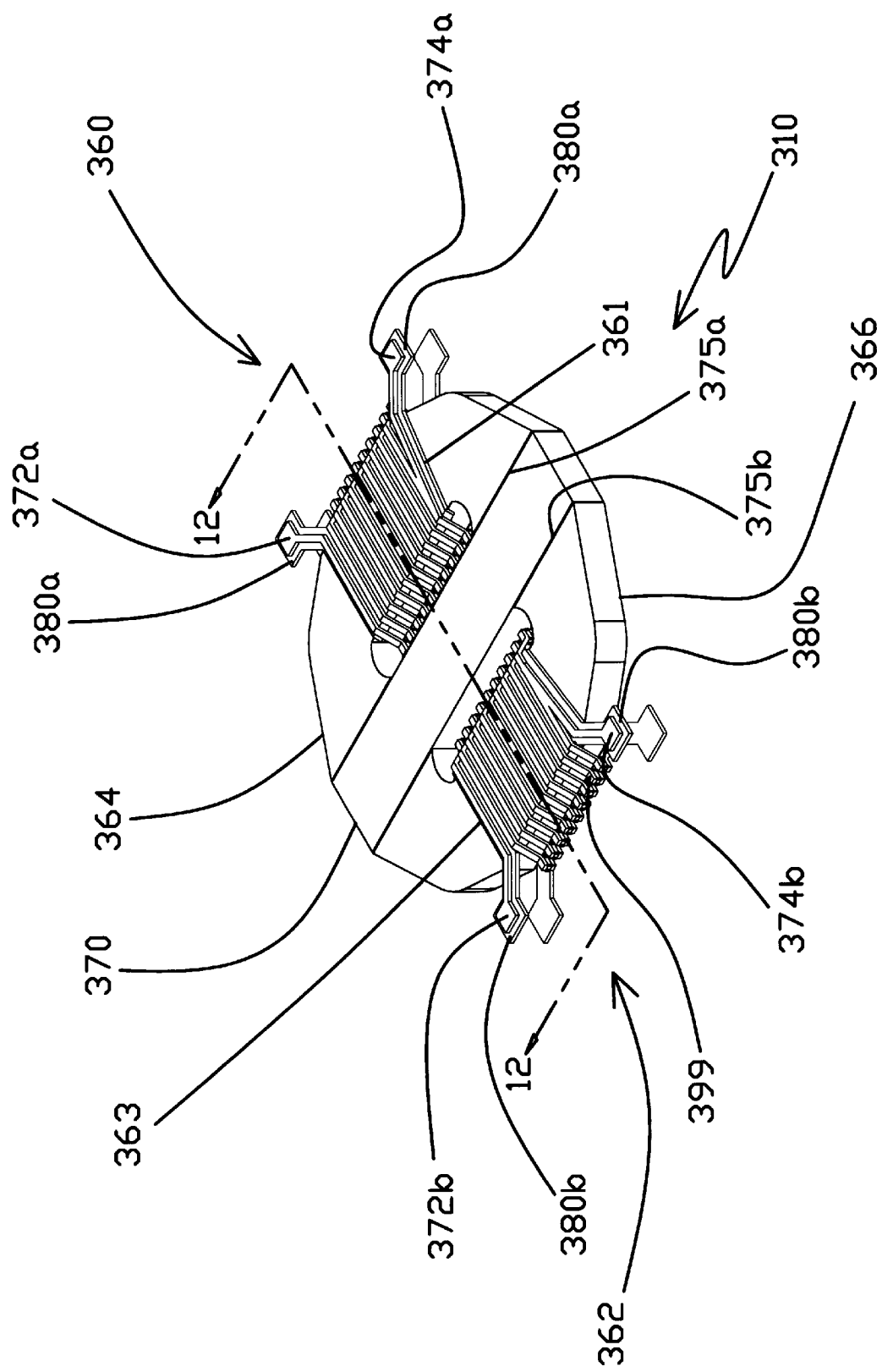
FIG. 11 is an isometric view of the microactuator shown in FIG. 10.
Figure 12:
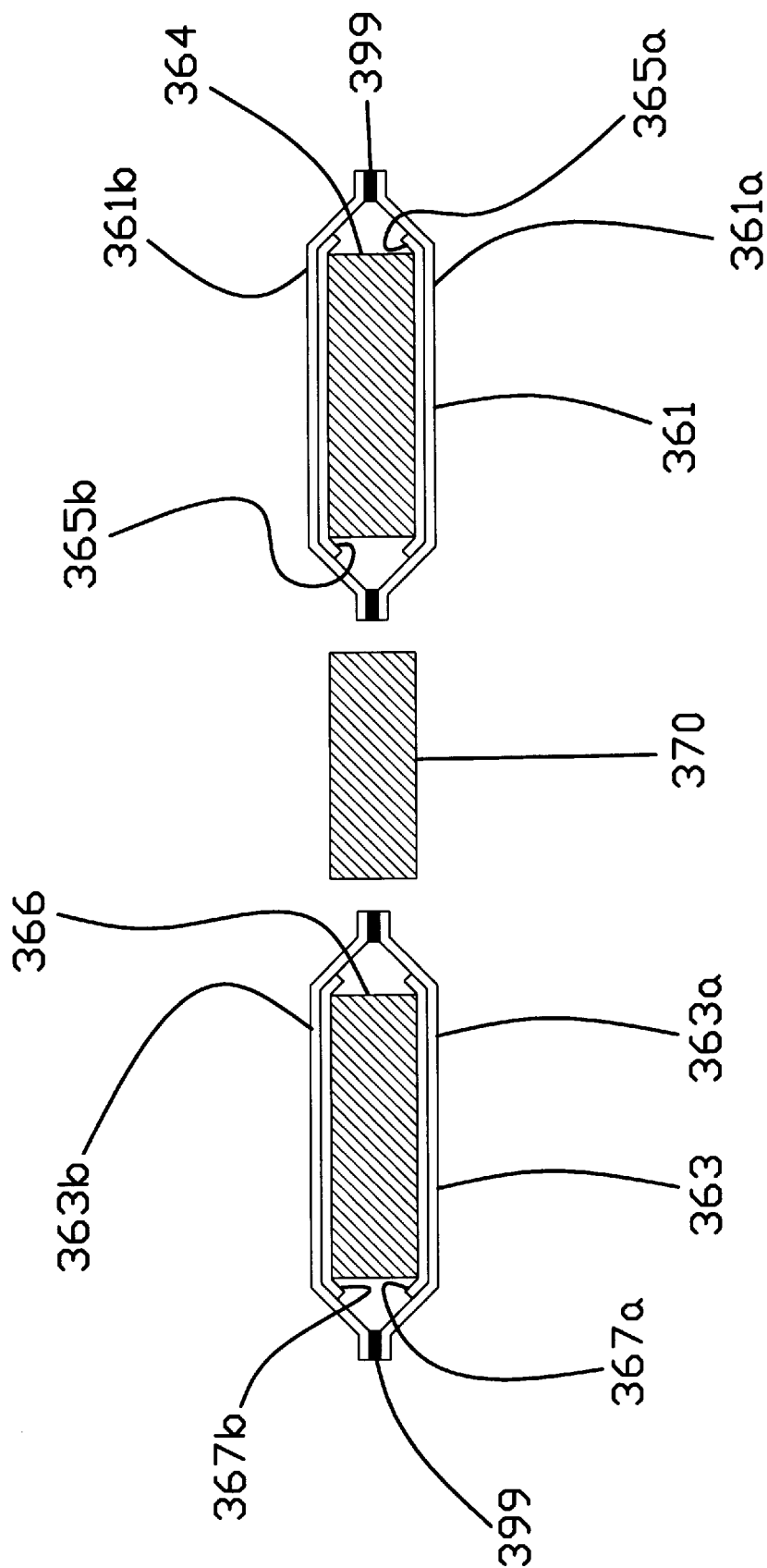
FIG. 12 is a sectional view of the microactuator shown in FIG. 10 taken along line 12—12 of FIG. 11.
Figure 13:
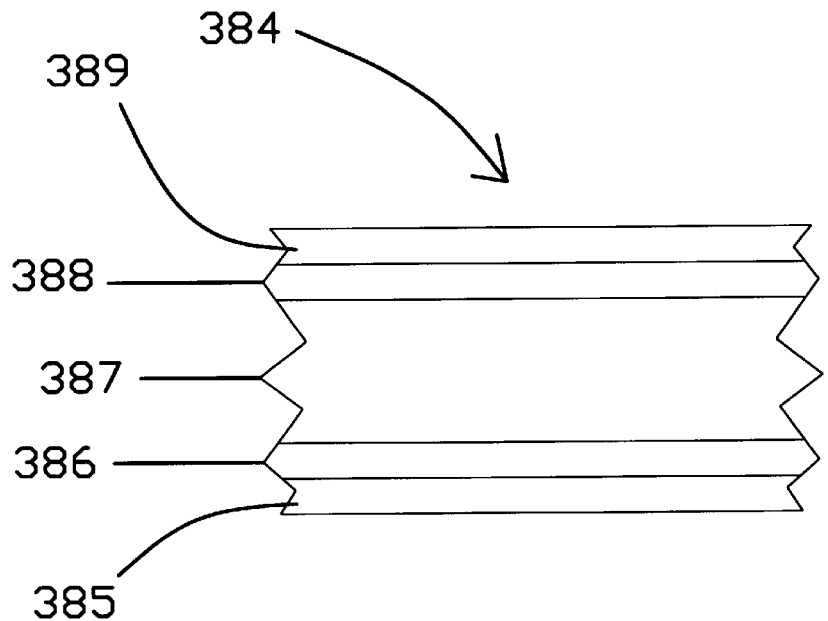
FIG. 13 is a side view of laminated sheet material from which the microactuator shown in FIG. 10 can be fabricated.

Another embodiment of the present invention is shown in FIGS. 10, 11, and 12. Elements in FIGS. 10, 11, and 12 identical to those of FIGS. 1a, 2, 4, and 6 are labeled with identical numerals and elements in FIGS. 10, 11, and 12 functionally similar to those shown in FIGS. 1a, 2, 4, and 6 are labeled with like numerals incremented by 300. In the embodiment shown in FIG. 10, microactuator 310 is mounted to load beam 312 which is similar to load beam 12 shown in FIG. 1a. Head suspension 308 includes load beam 312 and flexure 316 mounted at a distal end thereof Load beam 308 has a stationary section 315 and a moving section 319. Moving section 319 includes flexure 316 rigid region 317, spring region 318, and a moving portion 342 of mounting region 314. Stationary section 315 includes a stationary portion 340 of mounting region 314. Moving portion 342 of mounting region 314 is suspended by linkage members and resilient support beams 350a, 350b, and 350c from stationary portion 340 to allow moving portion 342 to pivot with respect to stationary portion 340. In the embodiment shown in FIG. 10, load beam 312 is mounted to extended base plate 20. Load beam 312 can also be mounted to non-extended base plate 120 shown in FIG. 5.

In the embodiment shown in FIG. 10, microactuator 310 is mounted to load beam 312. Microactuator 310 has first magnetic field generating coil 360, second magnetic field generating coil 362, first stationary pole 364, second stationary pole 366, and moving pole 370.

Microactuator 310 is placed in the same location on load beam 312 and operates in the same way as microactuator 10 mounted to load beam 12. First magnetic field generating coil 360 is mounted on arm 346 of mounting region 314, second magnetic field generating coil 362 is mounted on arm 348 of mounting region 314, and moving pole 370 is mounted on moving portion 342 of mounting region 314. First magnetic field generating coil 360 is energized in response to tracking control signals to move flexure 316, including a read/write head (not shown) along tracking axis 390 and second magnetic field generating coil 362 is energized in response to tracking control signals to move flexure 316 along tracking axis 392.

However, the structure and fabrication of coils 360 and 362, and poles 364, 366, and 370 of microactuator 310 is not the same as coils 60 and 62, and poles 64, 63 and 70 of microactuator 10. As shown in FIG. 11, coil 360 is formed from an electrically conducting lead 361 formed in a helix around a center portion of generally C-shaped first stationary pole 364. As shown in FIG. 12, which is a sectional view of microactuator 310 taken along line 12—12 shown in FIG. 11, a first lower electrically insulating layer 365a and first upper electrically insulating layer 365b are located between a lower and upper face, respectively, of pole 364 and lead 361 to physically and electrically isolate lead 361 from pole 364. Referring again to FIG. 11, electrical contacts 372a and 374a are supported by tabs 380a to allow connection of coil 360 to a servo control (not shown). Similarly, coil 362 is formed from an electrically conducting lead 363 formed in a helix around a center section of generally C-shaped second stationary pole 366. A second lower electrically insulating layer 367a and second upper electrically insulating layer 367b are located between a lower and upper face, respectively, of pole 366 and lead 363. Electrical contacts 372b and 374b are supported by tabs 380b. Leads 361 and 363 are preferably formed of copper but can be formed of other electrically conducting material. Poles 364 and 366 are preferably formed of NiFe but can be formed from other material having relatively high magnetic permeability. Electrically insulating layers 365a, 365b, 367a, and 367b are preferably formed from polyimide but can be formed of other electrically insulating material.

Generally C-shaped poles 364 and 366 open towards each other with generally rectangular moving pole 370 therebetween. Gap 375a is formed between first magnetic pole 364 and moving pole 370 and gap 375b is formed between second magnetic pole 366 and moving pole 370 to allow moving pole 370 to laterally shift between first stationary pole 364 and second stationary pole 366. Moving pole 370 is preferably formed from NiFe but can be formed of other material having relatively high magnetic permeability.

A method of fabrication of microactuator 310 can be described with reference to FIGS. 12, 13, 14, and 15. Microactuator 310 is formed from a laminated sheet 384 which has five layers: a first layer 385 of Cu or other electrically conductive material; a second layer 386 of polyimide or other electrically insulating material; a third layer 387 of NiFe or other material having relatively high magnetic permeability; a fourth layer 388 of polyimide or other electrically insulating material; and a fifth layer 389 of Cu or other electrically conducting material. Laminated sheet 384 is chemically etched or otherwise cut into a sheet having the dimensions of microactuator 310. First layer 385, second layer 386, fourth layer 388 and fifth layer 389 are then chemically etched to form first lower lead portion 361a, first upper lead portion 361b, second lower lead portion 363a, second upper lead portion 363b, first lower insulating layer 365a, first upper insulating layer 365b, second lower insulating layer 367a, second upper insulating layer 367b, tabs 380a and 380b and contacts 372a, 372b, 374a, and 374b. Third layer 387 is then chemically etched to form first stationary pole 364, second stationary pole 366, and moving pole 370.

Figure 14:
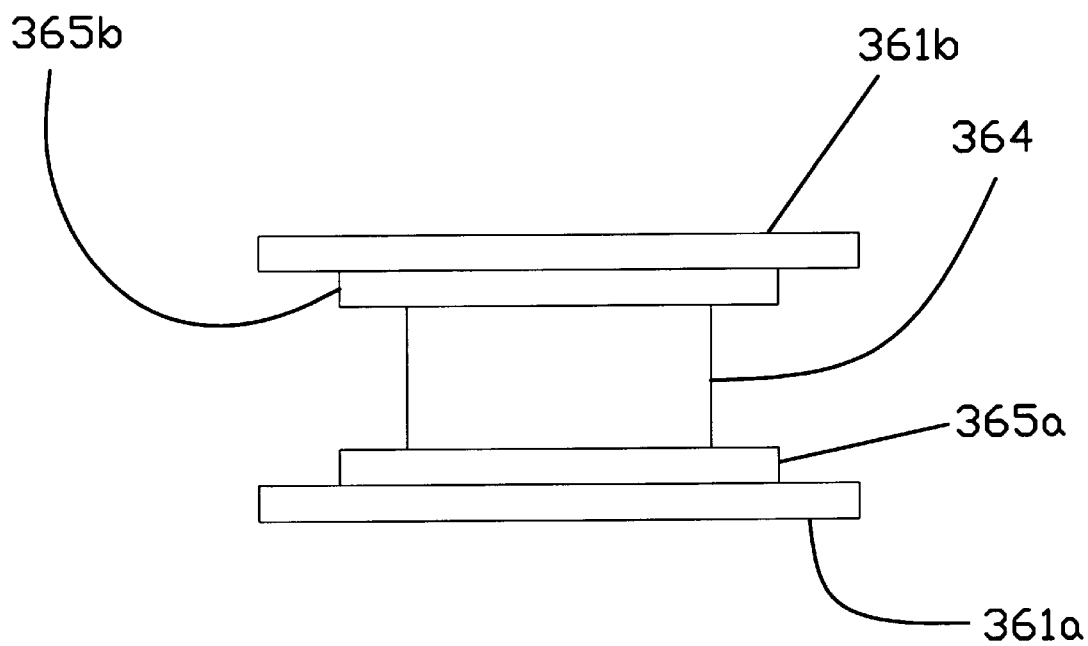
FIG. 14 is a side view of the laminated sheet material shown in FIG. 13 after a portion of the material has been removed by chemical etching or other known processes.

As shown in FIG. 14, which shows only the section of laminated sheet 384 which is formed into first stationary pole 364 and first magnetic field generating coil 360, when forming first magnetic field generating coil 360 around first stationary pole 364, third layer 387 is chemically etched to undercut first lower lead portion 361a, first upper lead portion 361b, first lower insulating layer 365a, and first upper insulating layer 365b. During this etching process, coil 360 is coated with gold to mask coil 360 from the NiFe etchant. Also, first lower insulating layer 365a and first upper insulating layer 365b are chemically etched to undercut first lower lead portion 361a and first upper lead portion 361b. Second stationary pole 366 and second magnetic field generating coil 362 are formed in the same way.

Figure 15:
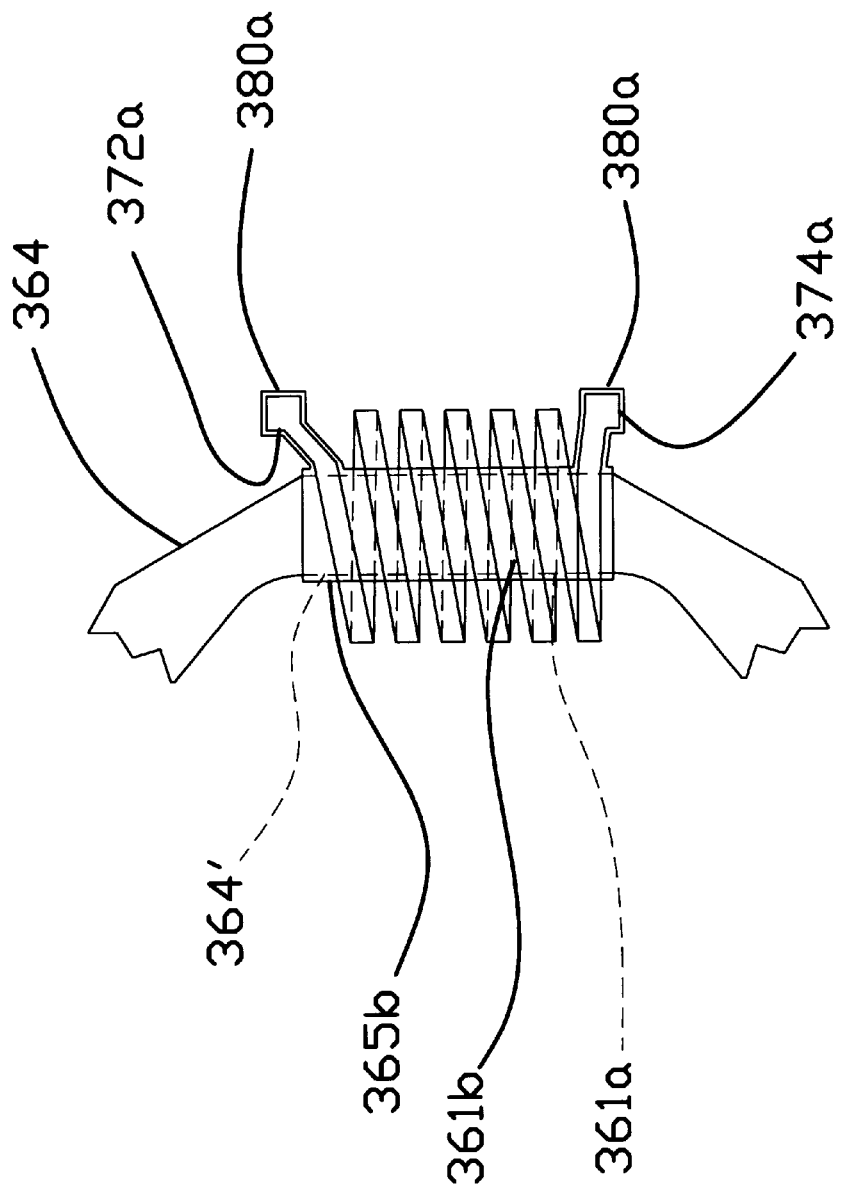
FIG. 15 is a partial top view of the microactuator shown in FIG. 10.

As shown in FIG. 15, which is a top view of first stationary pole 364 and first magnetic field generating coil 360, first lower lead portion 361a is formed such that individual sections of first lower lead portion 361a cross pole 364 perpendicular to edge 364' thereof. Also, first upper lead portion 361b is formed such that individual sections thereof cross pole 364 at an angle to the individual sections of first lower lead portion 361a. Opposite endpoints of an individual section of first upper lead portion 361b are located directly above opposite endpoints of adjacent individual sections of first lower lead portion 361a. The endpoints of the individual sections of first upper lead portion 361b and first lower lead portion 361a which are directly above one another are mechanically pressed together and electrically connected by soldering the endpoints together with solder pieces 399 shown in FIG. 12. The endpoints of the individual section of first upper lead portion 361b and first lower lead portion 361a can also be pressed together and electrically connected by ultrasonic welding or other known processes to form electrically conducting lead 361.

Second magnetic field generating coil 362 is formed around second stationary pole 366 in the same way that first magnetic field generating coil 360 is formed around first stationary pole 364. Microactuator 310 can then be mounted on load beam 12 as described above and gaps 375a and 375b can be cut in microactuator 310 by a laser or other known means.

Figure 16:
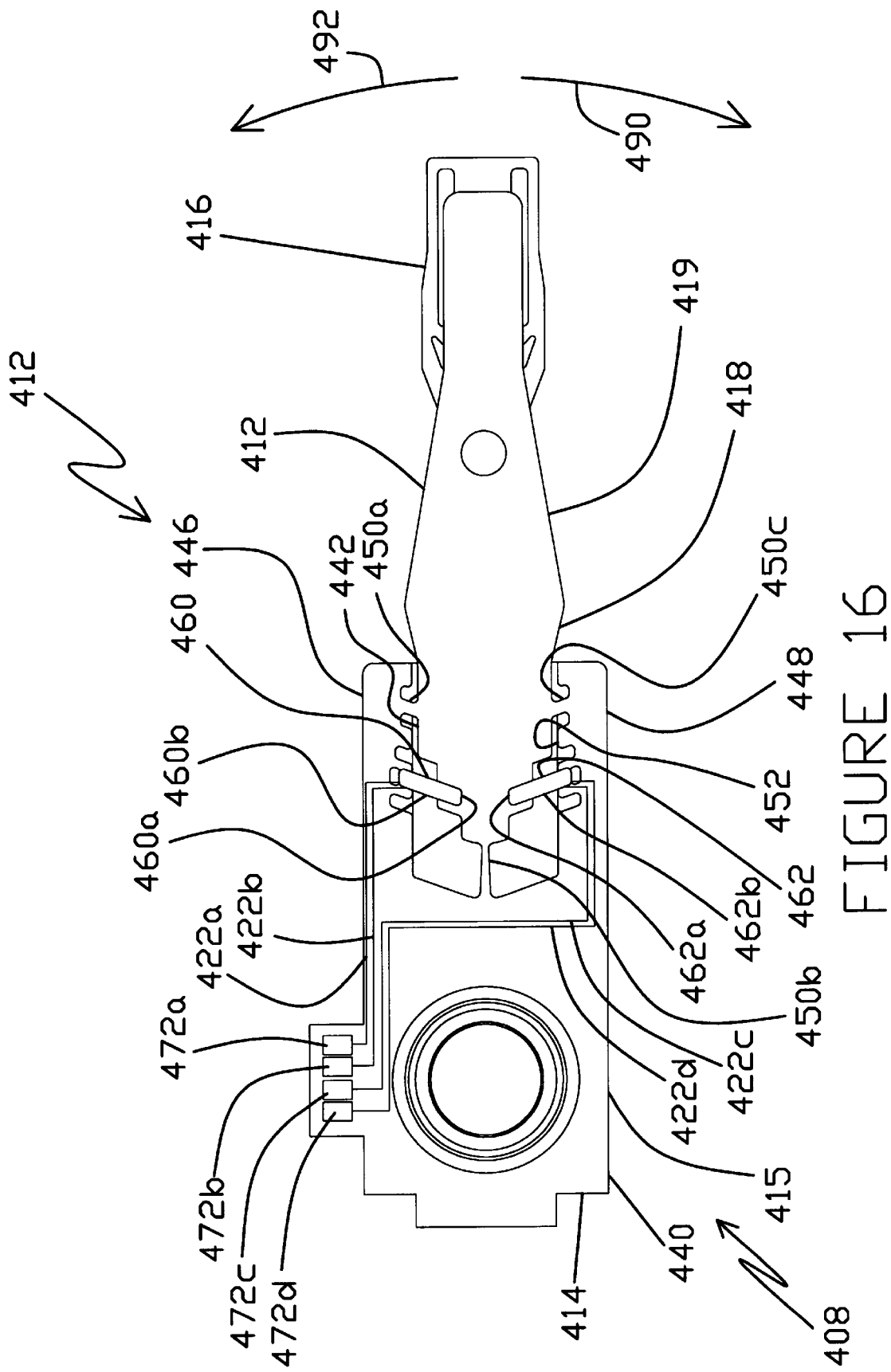
FIG. 16 is a top view of a head suspension having piezoelectric or electrostrictive microactuator devices mounted thereto in accordance with a fifth embodiment of the present invention.

Another embodiment of the present invention is shown in FIG. 16. Elements in FIG. 16 identical to those of FIGS. 1a, 2, 4, and 6 are labeled with identical numerals and elements in FIGS. 16 functionally similar to those shown in FIG. 1a, 2, 4, and 6 are labeled with like numerals incremented by 400. In the embodiment shown in FIG. 16, two piezoelectric or electrostrictive elements 460 and 462 serve as a microactuator mounted on load beam 412 to move flexure 416 and a read/write head (not shown) mounted thereto along either tracking axis 490 or 492. Head suspension 408 is similar to head suspension 8 shown in FIG. 1a. Head suspension 408 includes load beam 412 and flexure 416 mounted at a distal end thereof. Head suspension 408 has a stationary section 415 and a moving section 419. Moving section 419 includes flexure 416 rigid region 417, spring region 418, and a moving portion 442 of mounting region 414. Stationary section 415 includes a stationary portion 440 of mounting region 414. Moving portion 442 of mounting region 414 is suspended by support beams 450a, 450b, and 450c from stationary portion 440 to allow moving portion 442 to pivot with respect to stationary portion 440. In the embodiment shown in FIG. 10, load beam 412 is mounted to extended base plate 20. Load beam 412 can be mounted to extended base plate 20 shown in FIG. 4 or non-extended base plate 120 shown in FIG. 5.

A first element 460 extends across gap 452 between first longitudinally extending arm 446 and moving portion 442 of mounting region 414. Element 460 is attached to arm 446 and moving portion 442 by adhesive or other known means. Electrical leads 422a and 422b are attached to electrical contacts 472a and 472b to connect element 460 to a servo control system (not shown). A second element 462 extends across gap 452 between second longitudinally extending arm 448 and moving portion 442 of mounting region 414. Element 462 is attached to arm 448 and moving portion 442 by adhesive or other known means. Electrical leads 422c and 422d are attached to electrical contacts 472c and 472d, respectively, to connect element 462 to a servo control system.

Elements 460 and 462 are generally parallelogram shaped. Element 460 has a short side 460a and a long side 460b and element 462 has a short side 462a and a long side 462b. Element 460 is configured to expand in a direction along long side 460b in response to a voltage signal from the servo control system. Element 462 is configured to expand in a direction along long side 462b in response to a voltage signal from the servo control system. Elements 460 and 462 can each be biased with a voltage so that when moving portion 419 is in an undeflected state, that is, flexure 416 is not moved along tracking axis 490 or 492, elements 460 and 462 are in positions approximately halfway between their fully expanded stated and fully contracted states. To move flexure 416 along tracking axis 492, the voltage on element 462 is decreased so that element 462 contracts and the voltage on element 460 is increased so that element 460 expands. As element 460 expands moving portion 442 of mounting region 414 is pushed away from arm 446 and as element 462 contracts, moving portion 442 is pulled towards arm 448 causing the moving section 419 of head suspension 408 to pivot about a point in moving portion 442. This motion causes flexure 416 and the read/write head mounted thereto (not shown) to move along tracking axis 492. Likewise, raising the bias voltage on element 462 causes element 462 to expand and lowering the bias voltage on element 460 causes element 460 to contract to move moving portion 419 and flexure 16 to move along tracking axis 490.

As noted above, elements 460 and 462 can be piezoelectric or electrostrictive. Piezoelectric elements can be fabricated from lead-zirconate-titanate and are commercially available from Newport Corporation of Irvine Calif. Electrostrictive elements can be fabricated of lead-magnesium-niobate and are also commercially available from Newport Corporation of Ivine, Calif. Because piezoelectric elements or electrostrictive elements do not use magnetic field generating coils, use of such elements reduces the likelihood of interference between microactuator tracking signals and read/write processes.

In an embodiment of the present invention in which elements 460 and 462 are piezoelectric, element 460 can be oriented on load beam 412 such that when the voltage at the end of element 460 that is mounted on arm 446 is higher than the voltage at the end of element 460 that is mounted to moving portion 462, element 460 expands. Also, element 462 can be oriented so that when the voltage at the end of element 462 that is mounted on arm 448 is higher than the voltage at the end of element 462 that is mounted to moving portion 442, element 462 contracts. In this way, a single control voltage can be used to shift load beam 412 along either tracking axis 490 or 492. This configuration has the advantage of reducing the number of leads required to connect elements 460 and 462 to a servo control system (not shown).

Figure 17:
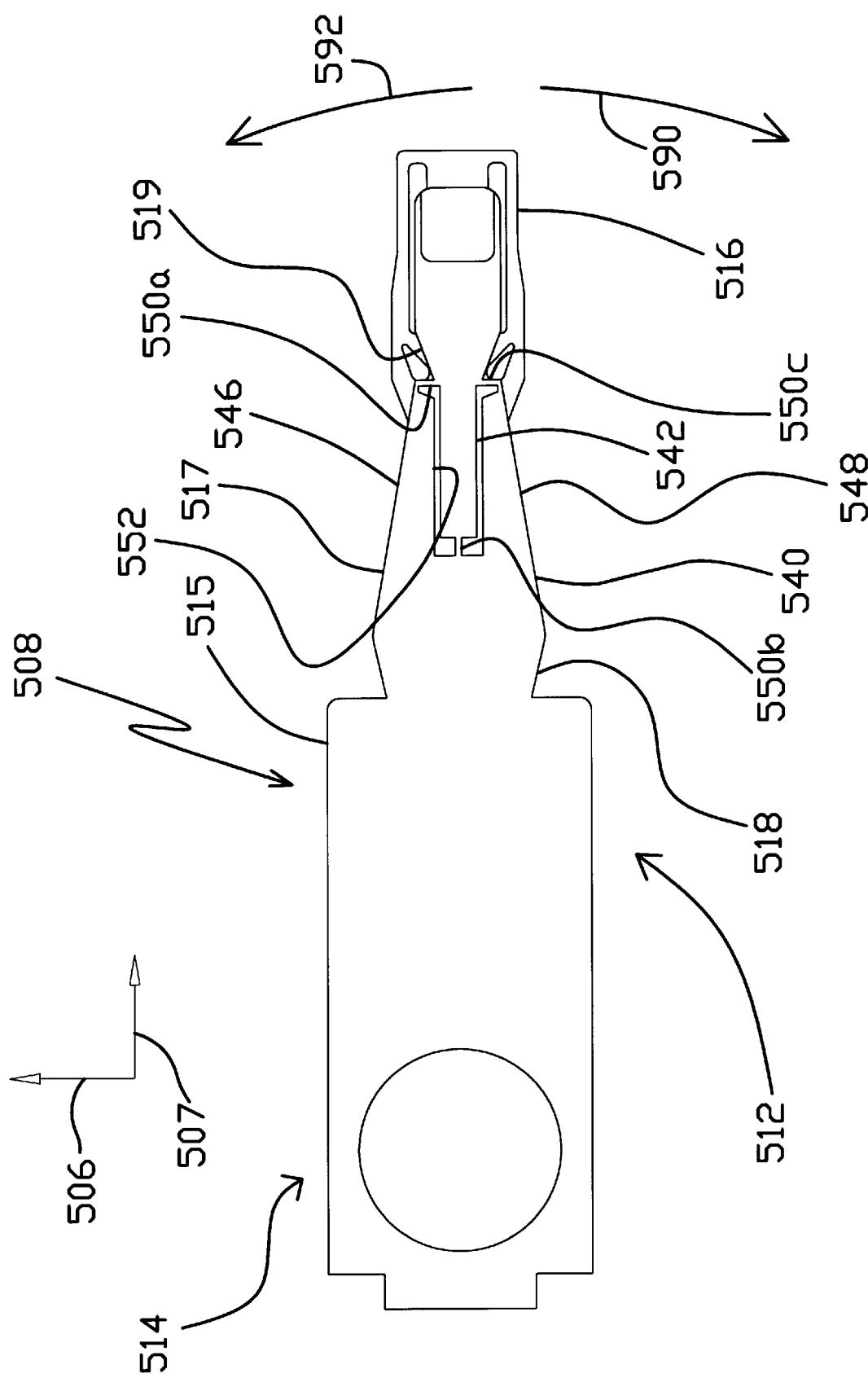
FIG. 17 is a top view of a head suspension in accordance with a sixth embodiment of the present invention.

FIG. 17 shows another embodiment of the present invention. Elements in FIG. 17 which are functionally similar to those of FIG. 1a are shown with like numerals incremented by 500. FIG. 17 shows a head suspension 508 adapted to accommodate a microactuator. Head suspension 508 includes load beam 512 having an extended mounting region or base 514 on a proximal end, a flexure 516 on a distal end, a relatively rigid region 517 adjacent to the flexure, and a radius or spring region 518 between the mounting region 514 and rigid region 517. Load beam 512 can be fabricated from a sheet of stainless steel or other resilient material in a conventional manner.

Head suspension 508 has a stationary section 515 and a moving section 519. In the embodiment shown in FIG. 17, moving section 519 includes flexure 516, and a moving portion 542 of rigid region 517. Stationary section 515 includes mounting region 514, spring region 518, and a stationary portion 540 of rigid region 517. Stationary portion 540 has first longitudinally extending arm 546 and second longitudinally extending arm 548. Moving portion 542 of rigid region 517 is suspended between arms 546 and 548 by linkage members and resilient support beams 550a, 550b, and 550c which are located in the rigid region of load beam 512 between the flexure 516 and spring region 518. A Generally U-shaped gap 552 extends between stationary portion 540 and moving portion 542.

Resilient support beam 550a extends laterally across gap 552 between arm 546 and the moving portion 542, resilient support beam 550c extends laterally across gap 552 between arm 548 and moving portion 542, and resilient support beam 550b extends longitudinally across gap 552 between the stationary portion 540 and moving portion 542. Resilient support beams 550a, 550b, and 550c allow moving portion 542 to pivot with respect to stationary portion 540 about a point on moving portion 542. As noted above, flexure 516 is attached to the moving section 542 of rigid region 517. Accordingly, support beams 550a, 550b, and 550c allow flexure 516, to which a read/write head (not shown) is mounted, to pivot with respect to the stationary section of the base in the direction of either tracking axis 590 or 592. Specifically, shifting moving portion 542 towards arm 546 causes flexure 516 to move in the direction of tracking axis 590 and shifting moving portion 542 towards arm 548 causes flexure 516 to move in the direction of tracking axis 592. Placing the resilient members closer to the distal end of load beam 512 reduces the mass of the moving section 519. Reduced mass allows the moving section 519 to move more rapidly along tracking axis 590 or 592. This can reduce the amount of time associated with read/write processes.

Figure 2:
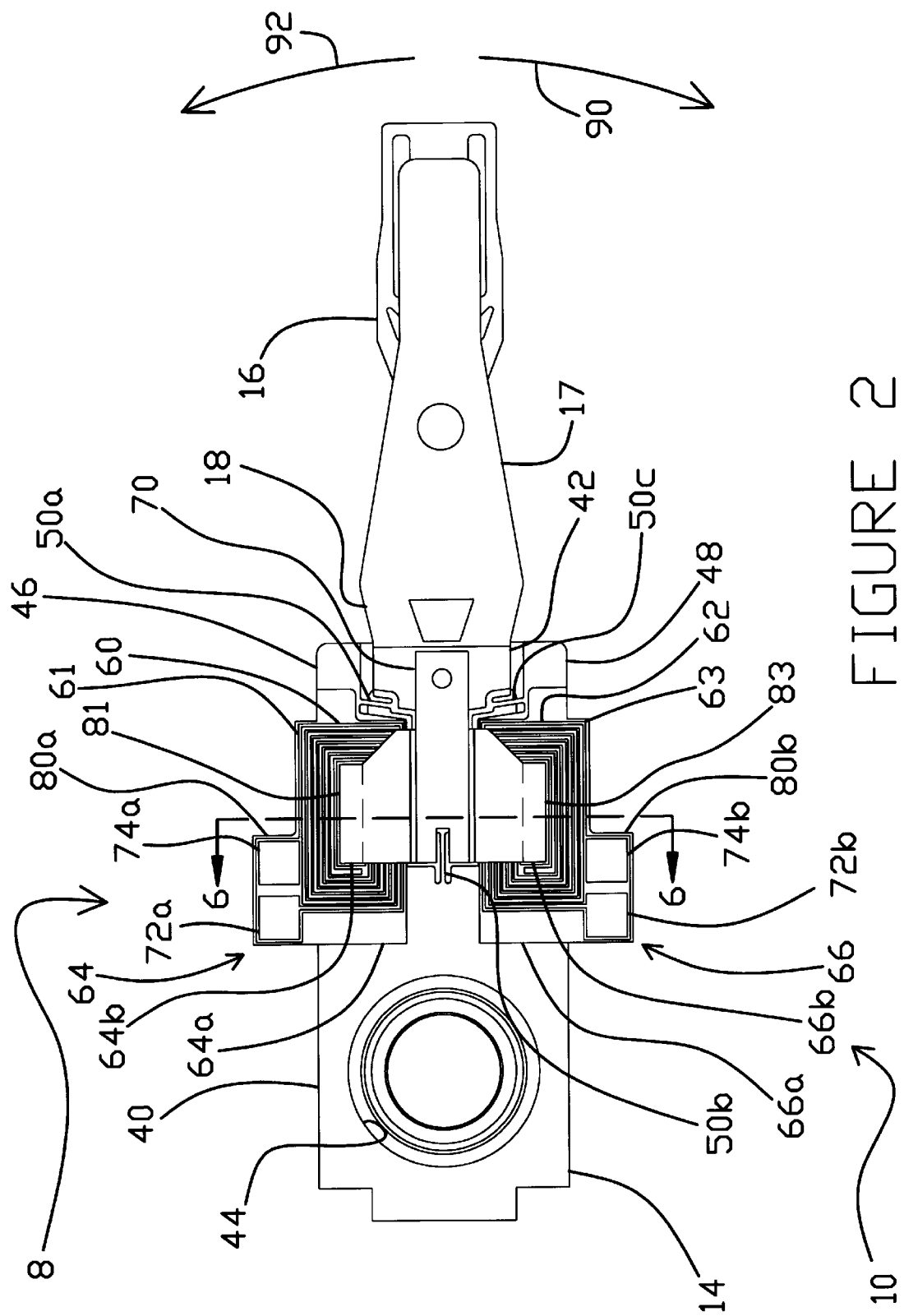
FIG. 2 is a top view of the head suspension shown in FIG. 1a having an extended base plate and microactuator mounted thereon in accordance with a first embodiment of the present invention.

Any microactuation device discussed above in relation to the present invention including microactuator 10 shown in FIG. 2, microactuator 210 shown in FIG. 8, microactuator 310 shown in FIG. 10, and piezoelectric or electrostrictive elements 460 and 462 shown in FIG. 16 can be mounted in the rigid region 517 of load beam 508 to shift moving portion 542 towards either arm 546 or 548 to pivot flexure 516 and a read/write head mounted thereto along tracking axis 590 or 592, respectively.

Figure 18:
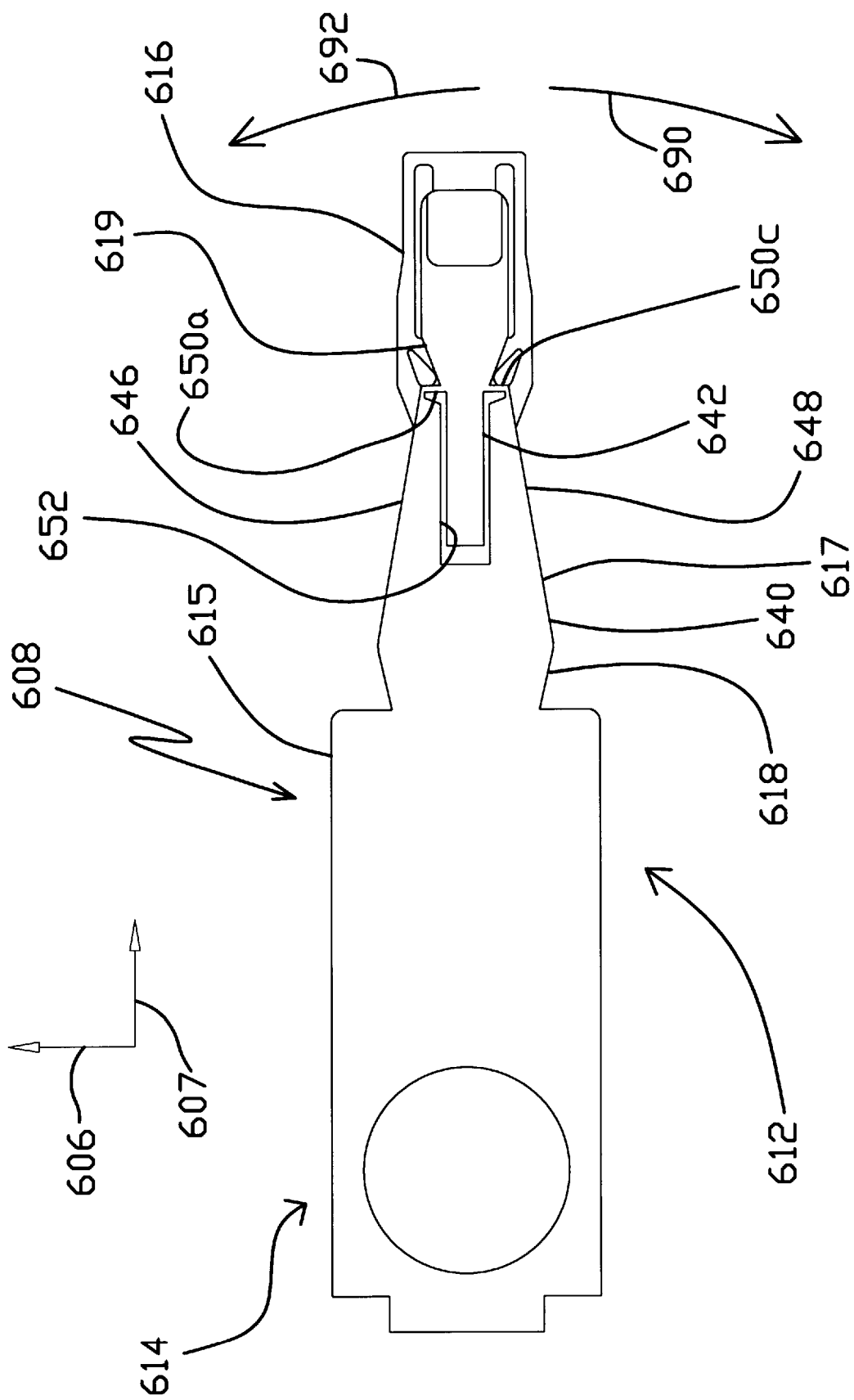
FIG. 18 is a top view of a head suspension in accordance with a seventh embodiment of the present invention.

Another embodiment of the present invention is shown in FIG. 18. Elements in FIG. 18 functionally similar to those shown in FIG. 17 are indicated with like numerals incremented by 100. FIG. 18 shows a head suspension 608 adapted to accommodate a microactuator. An important difference between head suspension 508 shown in FIG. 17 and head suspension 608 is that head suspension 608 has a linkage connecting a moving section 619 to a stationary section 615 with only two resilient support beams 650a and 650c supporting moving portion 642 of load beam 608 between arms 646 and 648 as opposed to the three resilient support beams 550a, 550b, and 550c of head suspension 508. Resilient support beam 650a extends laterally in a direction generally parallel to transverse axis 606 across gap 652 between arm 646 and the moving portion 642 of rigid region 617. Resilient support beam 650c extends laterally in a direction generally parallel to transverse axis 606 across gap 652 between arm 648 and moving portion 642. This places support beams 650a and 650c between the flexure 616 and the spring region 618. Removing resilient member 650b can reduce resistance to lateral movement of moving section 619. This can reduce response time associated with read/write functions.

The fabrication and operation including the ability of head suspension 608 to accommodate microactuation devices is the same as that described above with respect to head suspension 508 shown in FIG. 17.

Figure 19:
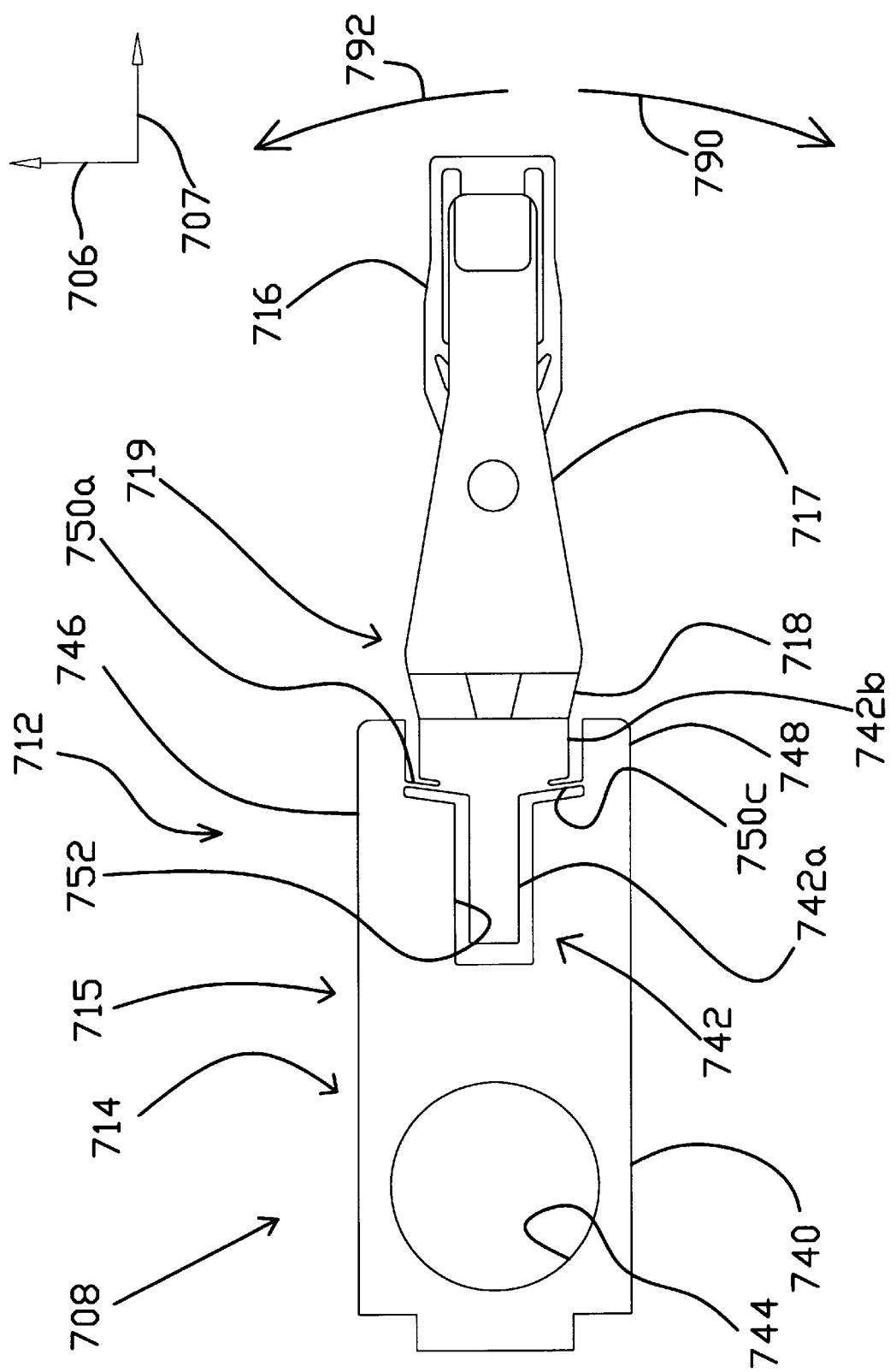
FIG. 19 is a top view of a head suspension in accordance with an eighth embodiment of the present invention.

Yet another embodiment of the present invention is shown in FIG. 19. Elements shown in FIG. 19 which are functionally similar to those shown in FIG. 1a are labeled with like numerals incremented by 700. A significant difference between head suspension 708 shown in FIG. 19 and head suspension 8 shown in FIG. 1a is that head suspension 708 has a linkage connecting moving section 719 to stationary section 715 with only two resilient support beams supporting moving portion 742 of mounting region 714 between arms 746 and 748 as opposed to the three resilient support beams 50a, 50b, and 50c of head suspension 8. Resilient support beam 750a extends laterally in a direction generally parallel to axis transverse 706 across gap 752 between arm 746 and the moving portion 742 of mounting region 714. Resilient support beam 750c extends laterally in a direction generally parallel to transverse axis 706 across gap 752 between arm 748 and moving portion 742. This places support beams 750a and 750c between the spring region 718 and a proximal end of head suspension 708. Removing resilient member 750b can reduce resistance to lateral movement of moving section 719. This can reduce response time associated with read/write functions.

The fabrication and operation is the same as that described above with respect to head suspension 8 including the ability of head suspension 708 to accommodate any microactuation device discussed above.

Though the present invention has been described with reference to preferred embodiments, those skilled in the are will recognize that changes can be made in form and detail without departing from the spirit and scope of the invention.

What is claimed is:

1. A disk drive suspension comprising:
   a load beam formed from a single sheet of material and including:
     a mounting region at a proximal end of the load beam;
     a rigid region adjacent to a distal end of the load beam;
     a spring region between the mounting region and the rigid region;
     a stationary section including a first longitudinally extending arm and a second longitudinally extending arm with an open region therebetween; and
     a moving section including a third longitudinally extending arm located in the open region between the first longitudinally extending arm and second longitudinally extending arm;
   a flexure at the distal end of the load beam and configured for receiving and supporting a read/write head;
   a linkage formed unitarily from the same sheet of material as the load beam and supporting the third longitudinally extending arm in the open region to allow the third longitudinally extending arm to transversely shift therein toward and away from the first longitudinally extending arm and the second longitudinally extending arm; and
   a microactuator mounted on the load beam and for transversely shifting the third longitudinally extending arm in the open region toward and away from the first longitudinally extending arm and the second longitudinally extending arm such that the moving section of the load beam and the flexure moves along a tracking axis with respect to the stationary section in response to tracking control signals.

2. The disk drive suspension of claim 1 wherein the load beam includes a generally U-shaped gap separating the third longitudinally extending arm from the first and second longitudinally extending arms such that the third longitudinally extending arm can pivot into the gap with respect to the stationary section.

3. The disk drive suspension of claim 2 wherein the load beam further includes a first resilient member and a second resilient member, the first resilient member extending transversely across the gap from the first longitudinally extending arm to the third longitudinally extending arm, and the second resilient member extending transversely across the gap from the second longitudinally extending arm to the third longitudinally extending arm.

4. The disk drive suspension of claim 3 including an extended base plate supporting the first and second longitudinally extending arms.

5. The disk drive suspension of claim 4 wherein the microactuator includes an electromagnetic microactuator.

6. The disk drive suspension of claim 5 wherein:
the microactuator includes at least a first magnetic field generating coil on the stationary section of the load beam; and
the moving section of the load beam includes ferrous material such that in response to tracking control signals, the at least first magnetic field generating coil is energized generating a force between the stationary section of the load beam and the moving section of the load beam tending to close a portion of the gap therebetween and pivoting the moving section of the load beam and the flexure along a tracking axis.

7. The disk drive suspension of claim 6 wherein the microactuator includes a second magnetic field generating coil located on the moving section of the load beam such that in response to tracking control signals a force is generated between the stationary section and the moving section tending to close a portion of the gap between the stationary section and the moving section and pivot the moving section of the load beam and the flexure along a tracking axis.

8. The disk drive suspension of claim 6 wherein at least the first magnetic field generating coil is placed on top of a first stationary pole formed of ferrous material.

9. The disk drive suspension of claim 4 wherein the microactuator includes a piezoelectric microactuator.

10. The disk drive suspension of claim 9 wherein at least a first piezoelectric element couples the moving section of the load beam to the first longitudinally extending arm.

11. The disk drive suspension of claim 4 wherein the microactuator includes an electrostrictive microactuator.

12. The disk drive suspension of claim 11 wherein at least a first electrostrictive element couples the moving section of the load beam to the first longitudinally extending arm.

13. The disk drive suspension of claim 4 wherein the mounting region includes a moving portion and a stationary portion, the first and second resilient members extend from the stationary portion to the moving portion, and the spring region, rigid region and flexure extend from the moving portion.

14. The disk drive suspension of claim 4 wherein the rigid region includes a moving portion and a stationary portion, the first and second resilient members extend from the stationary portion to the moving portion, and the distal end of the load beam and flexure extend from the moving portion.

15. A disk drive suspension comprising:
a load beam formed from a single sheet of material and having a mounting region at a proximal end, a rigid region adjacent to a distal end, a spring region between the mounting region and the rigid region, a stationary section, and a moving section;
a flexure at the distal end of the load beam and configured for receiving and supporting a read/write head;
a linkage including at least a first resilient member, a second resilient member, and a third resilient member each formed unitarily from the same sheet of material as the load beam and attaching the moving section of the load beam to the stationary section of the load beam, the first resilient member and the second resilient member extending in a transverse direction from the moving section to the stationary section and located between the flexure and proximal end of the load beam, and the third resilient member extending in a longitudinal direction and located between the first and second resilient members and the proximal end of the load beam such that the moving section can pivot with respect to the stationary section; and
a microactuator mounted on the load beam and for shifting the moving section of the load beam and the flexure along a tracking axis with respect to the stationary section in response to tracking control signals.

16. The disk drive suspension of claim 15 wherein the load beam includes a gap separating the stationary section from the moving section.

17. The disk drive suspension of claim 16 wherein the stationary section of the load beam includes a first longitudinally extending arm and a second longitudinally extending arm and a portion of the moving section of the load beam extends between the arms and is supported therein by the first resilient member, the second resilient member, and the third resilient member, the first resilient member extending transversely across the gap from the first longitudinally extending arm to the moving section, the second resilient member extending transversely across the gap from the second longitudinally extending arm to the moving section, and the third resilient member extending longitudinally across the gap from a central portion of the stationary section to the moving section such that the moving section can pivot with respect to the stationary section.

18. The disk drive suspension of claim 17 including an extended base plate supporting the first and second longitudinally extending arms.

19. The disk drive suspension of claim 18 wherein the microactuator includes an electromagnetic microactuator.

20. The disk drive suspension of claim 19 wherein:
the microactuator includes a first magnetic field generating coil on the first longitudinally extending arm and a second magnetic field generating coil on the second longitudinally extending arm; and
the moving section of the mounting region includes ferrous material such that in response to tracking control signals, the first and second magnetic field generating coils are energized generating a force between the stationary section of the load beam and the moving section of the load beam tending to close a portion of the gap between the stationary section and the moving section and pivoting the moving section including the flexure along a tracking axis.

21. The disk drive suspension of claim 20 wherein the microactuator includes a third magnetic field generating coil located on the moving section of the load beam such that in response to tracking control signals a force is generated between the stationary section and the moving section tending to close a portion of the gap between the stationary section and the moving section and pivot the moving section of the load beam including the flexure along a tracking axis.

22. The disk drive suspension of claim 21 wherein the first magnetic field generating coil is placed on top of a first stationary pole formed of ferrous material, the second magnetic field generating coil is placed on top of a second stationary pole formed of ferrous material, and the third magnetic field generating coil is placed on top of a third pole formed of ferrous material.

23. The disk drive suspension of claim 18 wherein the microactuator includes a piezoelectric microactuator.

24. The disk drive suspension of claim 23 wherein a first piezoelectric element couples the moving section of the load beam to the first longitudinally extending arm and a second piezoelectric element couples the moving section of the load beam to the second longitudinally extending arm.

25. The disk drive suspension of claim 18 wherein the microactuator includes a electrostrictive microactuator.

26. The disk drive suspension of claim 25 wherein a first electrostrictive element couples the moving section of the load beam to the first longitudinally extending arm and a second electrostrictive element couples the moving section of the load beam to the second longitudinally extending arm.

27. The disk drive suspension of claim 16 wherein the mounting region includes a moving portion and a stationary portion, the first and second resilient members extend from the stationary portion to the moving portion, and the spring region, rigid region and flexure extend from the moving portion.

28. The disk drive suspension of claim 16 wherein the rigid region includes a moving portion and a stationary portion, the first and second resilient members extend from the stationary portion to the moving portion, and the distal end of the load beam and flexure extend from the moving portion.

29. A disk drive suspension comprising:
a load beam including:
a mounting region at a proximal end of the load beam, the mounting region including a moving section and a stationary section, the stationary section including a first longitudinally extending arm and a second longitudinally extending arm with an open region therebetween, the moving section including a third longitudinally extending arm located in the open region between the first longitudinally extending arm and the second longitudinally extending arm;
a spring region adjacent to the mounting region; and
a rigid region adjacent to a distal end of the load beam, the spring region, rigid region, and distal end of the load beam attached to the moving section of the mounting region;
a flexure at the distal end of the load beam and configured for receiving and supporting a read/write head;
a linkage between the spring region and the proximal end of the load beam and including a first resilient member, a second resilient member, and a third resilient member each supporting the third longitudinally extending arm in the open region to allow the third longitudinally extending arm to shift transversely therein toward and away from the first longitudinally extending arm and the second longitudinally extending arm; and
an electromagnetic microactuator mounted on the mounting region and for shifting the third longitudinally extending arm in the open region toward and away from the first longitudinally extending arm and the second longitudinally extending arm to move the spring region, rigid region, and distal end of the load beam and the flexure along a tracking axis with respect to the stationary section of the mounting region and in response to tracking control signals.

30. The disk drive suspension of claim 29 wherein the load beam includes a gap separating the stationary section of the mounting region from the moving section of the mounting region.

31. The disk drive suspension of claim 30 wherein:
the electromagnetic microactuator includes a first magnetic field generating coil on the first longitudinally extending arm and a second magnetic field generating coil on the second longitudinally extending arm; and
the third longitudinally extending arm includes ferrous material such that in response to tracking control signals, the first and second magnetic field generating coils are energized generating a force between the stationary section of the mounting region and the moving section of the mounting region tending to close a portion of the gap between the stationary section and the moving section and pivoting the moving section and the flexure along a tracking axis.

32. The disk drive suspension of claim 31 wherein the microactuator includes a third magnetic field generating coil located on the moving section of the mounting region such that in response to tracking control signals a force is generated between the stationary section of the mounting region and the moving section thereof tending to close a portion of the gap between the stationary section and the moving section and pivot the moving section of the mounting region, the spring region of the load beam, the rigid region of the load beam, and the distal end of the load beam and the flexure along a tracking axis.

33. The disk drive suspension of claim 32 wherein the first magnetic field generating coil is placed on top of a first stationary pole formed of ferrous material, the second magnetic field generating coil is placed on top of a second stationary pole formed of ferrous material, and the third magnetic field generating coil is placed on top of a third pole formed of ferrous material.

34. The disk drive suspension of claim 29 wherein the spring region of the load beam and the rigid region of the load beam are formed separately from the remainder of the load beam and attached to the moving section of the mounting region.

35. The disk drive suspension of claim 29 wherein the load beam is formed from a single sheet of material and unitarily with the linkage.

* * * * *